US012577685B2

(12) United States Patent
Asai

(10) Patent No.: US 12,577,685 B2
(45) Date of Patent: Mar. 17, 2026

(54) ELECTROLYTIC WATER SPRAYING DEVICE

(71) Applicant: Panasonic Intellectual Property Management Co., Ltd., Osaka (JP)

(72) Inventor: Fumiaki Asai, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 569 days.

(21) Appl. No.: 18/005,630

(22) PCT Filed: May 18, 2021

(86) PCT No.: PCT/JP2021/018713
§ 371 (c)(1),
(2) Date: Jan. 16, 2023

(87) PCT Pub. No.: WO2022/018944
PCT Pub. Date: Jan. 27, 2022

(65) Prior Publication Data
US 2023/0272538 A1     Aug. 31, 2023

(30) Foreign Application Priority Data

Jul. 21, 2020    (JP) ................................. 2020-124245

(51) Int. Cl.
*C25B 1/04*        (2021.01)
*C02F 1/461*      (2023.01)
(Continued)

(52) U.S. Cl.
CPC ................ *C25B 1/04* (2013.01); *C02F 1/461* (2013.01); *C25B 9/01* (2021.01); *C25B 15/02* (2013.01); *C25B 15/023* (2021.01)

(58) Field of Classification Search
None
See application file for complete search history.

(56) References Cited

U.S. PATENT DOCUMENTS 7,303,660 B2 * 12/2007 Buckley ................. A61P 43/00
204/260
2006/0260954 A1 * 11/2006 Sano ................... C02F 1/46109
205/742
(Continued)

FOREIGN PATENT DOCUMENTS

JP        2008-029574 A      2/2008
JP        2009-072659 A      4/2009
(Continued)

OTHER PUBLICATIONS

English Translation of Taiwan Search Report dated Nov. 29, 2024 for the related Taiwan Patent Application No. 110117927.
(Continued)

*Primary Examiner* — Harry D Wilkins, III
(74) *Attorney, Agent, or Firm* — McDonald Hopkins LLC

(57) ABSTRACT

An electrolytic water spraying device (100, 100A) according to the present disclosure includes: a reservoir (14) that stores water; a dispensing timing controller (320) that controls a dispensing timing that is a timing at which an electrolysis-accelerating agent is to be dispensed into the reservoir (14); a dispensing amount controller (310) that controls a dispensing amount that is an amount of the electrolysis-accelerating agent to be dispensed into the reservoir (14); and an electrolyzer (17) that produces electrolyzed water by electrolyzing the water stored in the reservoir (14) and into which the electrolysis-accelerating agent has been dispensed.

21 Claims, 10 Drawing Sheets

(51) Int. Cl.
    C25B 9/01         (2021.01)
    C25B 15/02      (2021.01)
    C25B 15/023    (2021.01)

(56)          References Cited

U.S. PATENT DOCUMENTS

2009/0071843 A1    3/2009  Miyashita et al.
2014/0106007 A1*  4/2014  Shanahan ............. A01N 59/00
                                        424/661

FOREIGN PATENT DOCUMENTS

JP        2010-207668 A    9/2010
JP        2019-024811 A    2/2019
TW       200925120 A    6/2009

OTHER PUBLICATIONS

International Search Report issued in Patent Application No. PCT/
JP2021/018713 dated Jul. 20, 2021.

* cited by examiner

FIG. 4

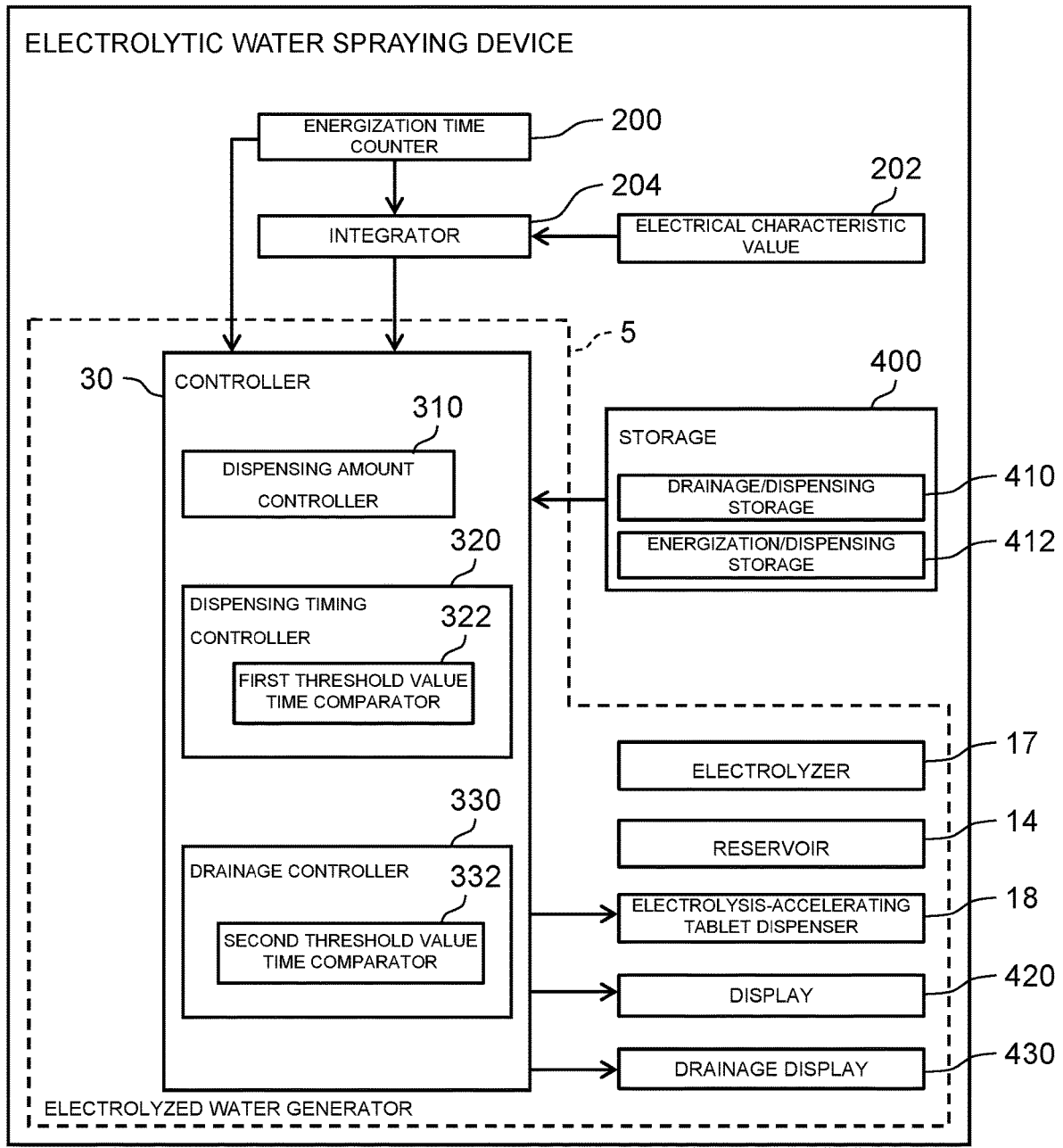

ELECTROLYTIC WATER SPRAYING DEVICE

ENERGIZATION TIME COUNTER — 200

INTEGRATOR — 204

ELECTRICAL CHARACTERISTIC VALUE — 202

30 — CONTROLLER ···· 5

DISPENSING AMOUNT CONTROLLER — 310

DISPENSING TIMING CONTROLLER — 320
FIRST THRESHOLD VALUE TIME COMPARATOR — 322

DRAINAGE CONTROLLER — 330
SECOND THRESHOLD VALUE TIME COMPARATOR — 332

STORAGE — 400
DRAINAGE/DISPENSING STORAGE — 410
ENERGIZATION/DISPENSING STORAGE — 412

ELECTROLYZER — 17

RESERVOIR — 14

ELECTROLYSIS-ACCELERATING TABLET DISPENSER — 18

DISPLAY — 420

DRAINAGE DISPLAY — 430

ELECTROLYZED WATER GENERATOR

100

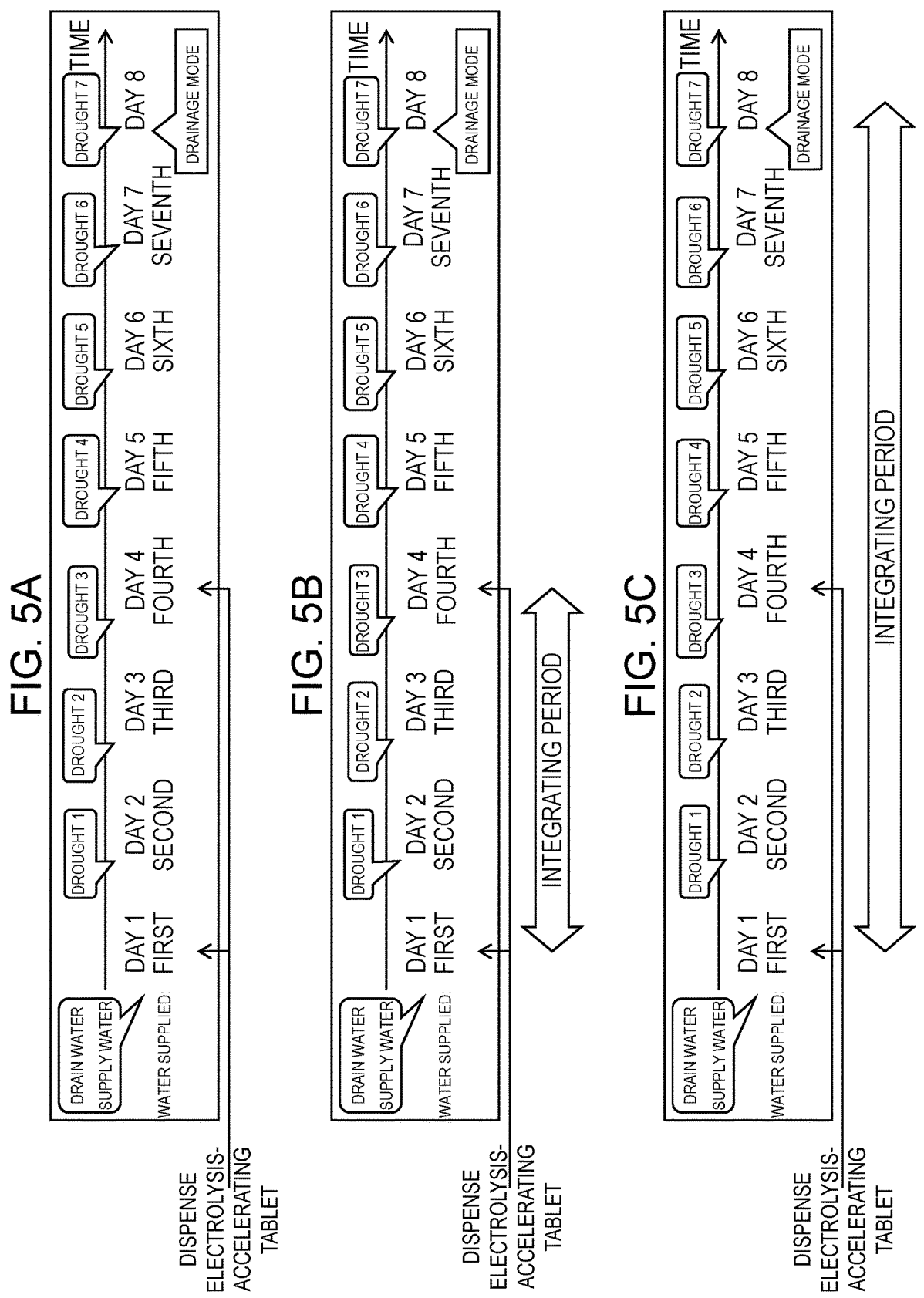

FIG. 6A

| EXAMPLE | ELECTRIC CURRENT VALUE | ENERGIZATION TIME | DE-ENERGIZATION TIME |
|---|---|---|---|
| FAN SPEED QUIET | 290 mA | 3 MINUTES | 38 MINUTES |
| FAN SPEED MEDIUM | 310 mA | 5 MINUTES | 31 MINUTES |
| FAN SPEED HIGH | 330 mA | 6 MINUTES | 21 MINUTES |

FIG. 6B

| EXAMPLE | ELECTRIC CURRENT VALUE | ENERGIZATION TIME | DE-ENERGIZATION TIME |
|---|---|---|---|
| FAN SPEED QUIET | 270 mA | 2.5 MINUTES | 40 MINUTES |
| FAN SPEED MEDIUM | 290 mA | 4.5 MINUTES | 33 MINUTES |
| FAN SPEED HIGH | 310 mA | 5.5 MINUTES | 23 MINUTES |

100A

100B

ELECTROLYTIC WATER SPRAYING DEVICE

TECHNICAL FIELD

The present disclosure relates to electrolytic water spraying devices that produce and spray electrolyzed water.

BACKGROUND ART

Electrolytic water spraying devices are known to produce electrolyzed water containing hypochlorous acid by electrolysis and spray the electrolyzed water to remove (inactivate) bacteria, fungi, viruses, smell, etc., in the air (for example, refer to Patent Literature (PTL) 1). In order to produce hypochlorous acid, it is necessary to produce water containing chloride ions in advance by dispensing an electrolysis-accelerating tablet such as salt into water that is subject to electrolysis.

CITATION LIST

Patent Literature

PTL 1: Unexamined Japanese Patent Publication No. 2008-029574

SUMMARY OF THE INVENTION

In a conventional electrolytic water spraying device, for example, in a predetermined period of time after water is supplied and an electrolysis-accelerating tablet is dispensed, water is supplied more than one time and an electrolysis-accelerating tablet is dispensed again. Therefore, depending on the usage of the electrolytic water spraying device, there may be a shortage of the electrolysis-accelerating tablet. The shortage of the electrolysis-accelerating tablet makes the electrolysis unstable.

An object of the present disclosure is to provide a technique that allows an electrolytic water spraying device to stably perform electrolysis regardless of usage.

An electrolytic water spraying device according to the present disclosure includes: a reservoir that stores water; a dispensing timing controller that controls a dispensing timing that is a timing at which an electrolysis-accelerating agent is to be dispensed into the reservoir; a dispensing amount controller that controls a dispensing amount that is an amount of the electrolysis-accelerating agent to be dispensed into the reservoir; and an electrolyzer that produces electrolyzed water by electrolyzing the water stored in the reservoir and into which the electrolysis-accelerating agent has been dispensed.

Note that an arbitrary combination of the above structural elements and a method, a device, a system, a recording medium, a computer program, or the like converted from representation in the present disclosure are also valid as aspects of the present disclosure.

With the electrolytic water spraying device according to the present disclosure, electrolysis can be stably performed regardless of usage.

BRIEF DESCRIPTION OF THE DRAWINGS

FIG. 4 is a function block diagram of the electrolytic water spraying device illustrated in FIG. 1A and FIG. 1B.
FIG. 5A is a diagram illustrating the outline of operation of the electrolytic water spraying device illustrated in FIG. 4.
FIG. 5B is a diagram illustrating the outline of operation of the electrolytic water spraying device illustrated in FIG. 4.
FIG. 5C is a diagram illustrating the outline of operation of the electrolytic water spraying device illustrated in FIG. 4.
FIG. 6A is a diagram illustrating another outline of operation of the electrolytic water spraying device illustrated in FIG. 4.
FIG. 6B is a diagram illustrating another outline of operation of the electrolytic water spraying device illustrated in FIG. 4.

DESCRIPTION OF EMBODIMENTS

Example 1

Before specifically describing an example of the present disclosure, the outline of the example will be described. The present example relates to an electrolytic water spraying device that produces electrolyzed water using water stored in a reservoir and sprays the electrolyzed water produced. The electrolytic water spraying device produces water containing chloride ions by dissolving an electrolysis-accelerating tablet in the water stored in the reservoir, and produces electrolyzed water containing reactive oxygen species by electrolysis of the water containing chloride ions by energizing an electrode. When the electrolytic water spraying device continues to operate, the water evaporates or the chloride ions are consumed, for example. Therefore, it is necessary to supply water to the reservoir again and dispense an electrolysis-accelerating tablet into the reservoir again. The amount of evaporation of the water or the amount of consumption of the chloride ions vary depending on the usage of the electrolytic water spraying device. For example, if the dispensing amount of electrolysis-accelerating tablets is too great or too small, the dispensing amount of chloride ions is too great or too small, making the electrolysis unstable.

In order to stably perform electrolysis, the electrolytic water spraying device according to the present example calculates an electrical characteristic energization amount by integrating energization time for the electrode and an electrical characteristic value measured during energization of the electrode. Note that the amount of consumption of chloride ions increases as the electrical characteristic energization amount increases, and the amount of consumption of chloride ions decreases as the electrical characteristic energization amount decreases. Therefore, the electrolytic water spraying device increases the dispensing amount of electrolysis-accelerating tablets as the electrical characteristic energization amount increases, and decreases the dispensing amount of electrolysis-accelerating tablets as the electrical characteristic energization amount decreases.

Figures 1A, 1B:
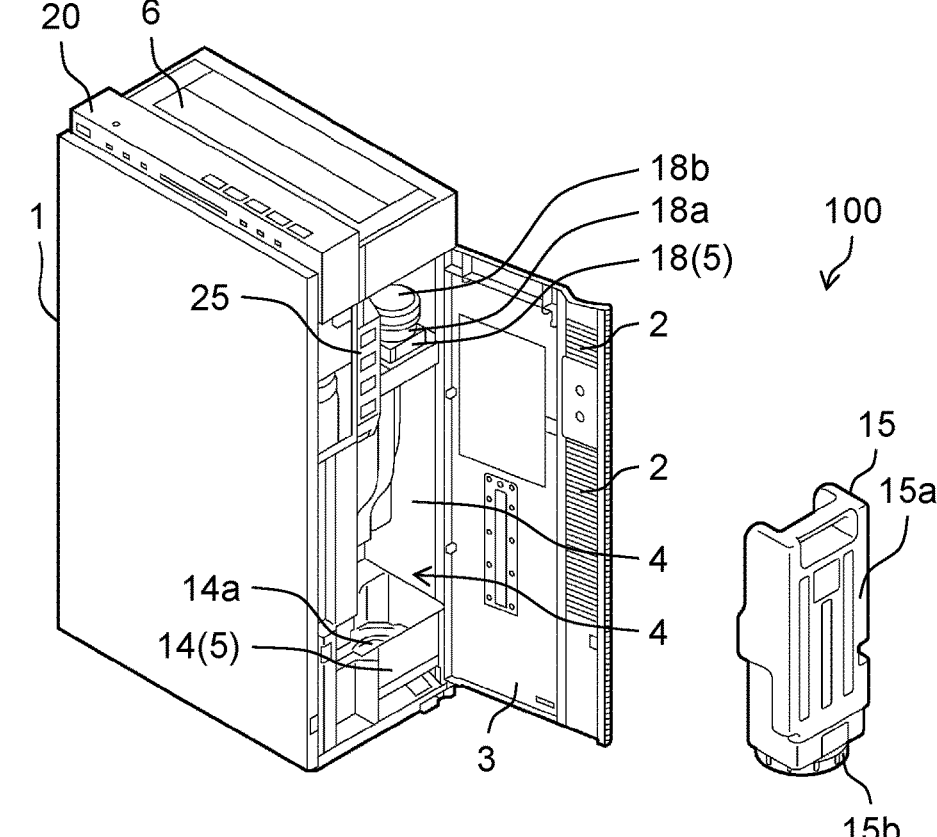
FIG. 1A is a diagram illustrating the structure of an electrolytic water spraying device according to Example 1.
FIG. 1B is a diagram illustrating the structure of the electrolytic water spraying device according to Example 1.

Hereinafter, an embodiment of the present disclosure will be described with reference to the accompanying drawings. FIG. 1A and FIG. 1B illustrate the structure of electrolytic water spraying device 100. FIG. 1A is a perspective view of electrolytic water spraying device 100 as viewed from the front of electrolytic water spraying device 100. FIG. 1B is a perspective view of electrolytic water spraying device 100 with panel 3 of FIG. 1A open as viewed from the front of electrolytic water spraying device 100.

Note that for illustrative purposes, the following expressions may be found below.

Specifically, a direction perpendicular to electrolytic water spraying device 100 placed as illustrated in FIG. 1A is defined as a vertical direction and thus, the terms "upper" and "lower" may be used on that premise. Similarly, assuming that the direction perpendicular to electrolytic water spraying device 100 placed as illustrated in FIG. 1A is the vertical direction, a surface of electrolytic water spraying device 100 that is located above on that premise may be referred to as a "top surface" or an "upper surface".

Electrolytic water spraying device 100 includes body case 1 in the approximate shape of a box. Air inlet 2 in the approximate shape of a square is provided in each of both side surfaces of body case 1. Air outlet 6 that opens and closes is provided in the top surface of body case 1. In FIG. 1A and FIG. 1B, air outlet 6 is closed.

Figure 2:
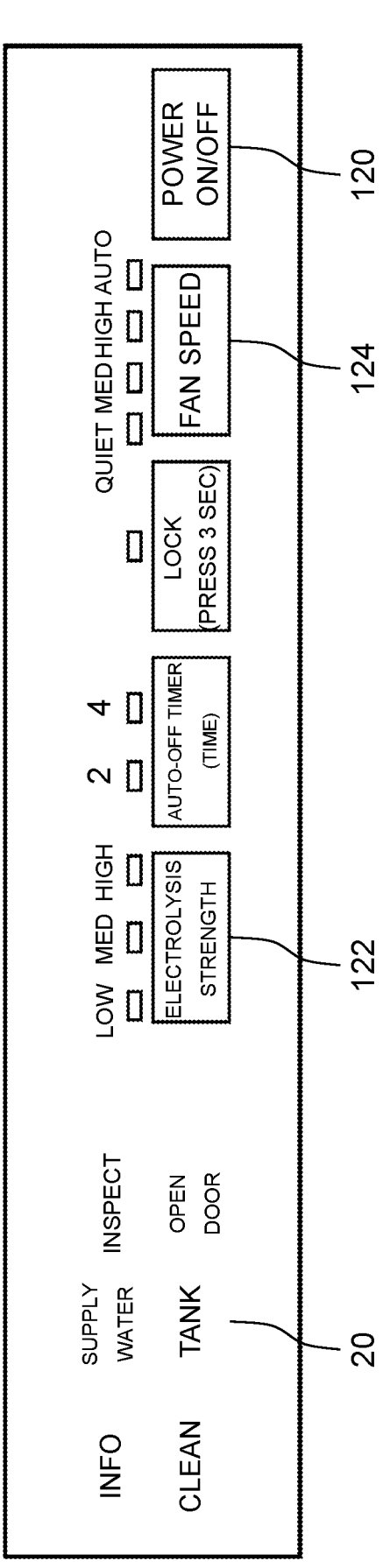
FIG. 2 is a diagram illustrating the structure of a top panel illustrated in FIG. 1A and FIG. 1B.

Top panel 20 is provided in a front area of the upper surface of body case 1. FIG. 2 illustrates the structure of top panel 20. Top panel 20 includes: power button 120 that is pressed to turn on and off electrolytic water spraying device 100; electrolysis strength button 122 that is pressed to change the strength of electrolysis; and fan speed button 124 that is pressed to change a fan speed. The pressing of electrolysis strength button 122 causes the strength of electrolysis to be switched between three levels, namely, "low", "medium", and "high". The pressing of fan speed button 124 causes the fan speed to be switched between four levels, namely, "quiet", "medium", "high", and "automatic". A plurality of lights the states of lighting of which are used to indicate the states of electrolytic water spraying device 100 or provide various instructions to users, for example, are provided on top panel 20. For example, according to the state of lighting of a light, a user is prompted to drain water from reservoir 14.

Panel 3 that can open and close is provided on body side surface 1A that is a side surface of body case 1 that is located on the right-hand side (a side surface of body case 1 that is located in one direction) as viewed from the front thereof. Panel 3 includes air inlet 2 on the side surface of body case 1 that is located in one direction. Body case 1 includes opening 4 in the shape of a longitudinal square that is covered by panel 3. In body case 1, reservoir 14, water feeder 15, tablet-dispensing case 18a, etc., which will be described later, are disposed in such a manner that these can be removed through opening 4.

Furthermore, internal panel 25 that can be operated by a user through opening 4 is provided in body case 1. A plurality of lights the lighting states of which are used to indicate the states of electrolytic water spraying device 100 or provide various instructions to users are provided on internal panel 25. Furthermore, a plurality of operating buttons for users to provide various notifications to electrolytic water spraying device 100 are provided on internal panel 25. One of the plurality of operating buttons is used to, when a notification prompting drainage of water from reservoir 14 is displayed, notify electrolytic water spraying device 100 of the drainage of water after a user drains water from reservoir 14. When a user operates the operating button for notifying electrolytic water spraying device 100 that the water was drained, electrolytic water spraying device 100 determines that the drainage of water from reservoir 14 has been completed.

Reservoir 14 can be removed from body case 1 through opening 4. Water is drained from reservoir 14 after reservoir 14 is removed from body case 1 through opening 4.

Internal panel 25 is provided in a position where internal panel 25 can be operated with panel 3 open. Therefore, when a light on top panel 20 indicates some notification, a user is required to open panel 3 to turn off the indication (respond to the notification from the light). This allows electrolytic water spraying device 100 to prompt the user to drain water from reservoir 14 in accordance with the action of opening panel 3. Furthermore, when operating internal panel 25, the user can check the state of reservoir 14 through opening 4. Thus, the user can visually confirm that water has been drained from reservoir 14 and then operate internal panel 25.

Figures 3A, 3B:
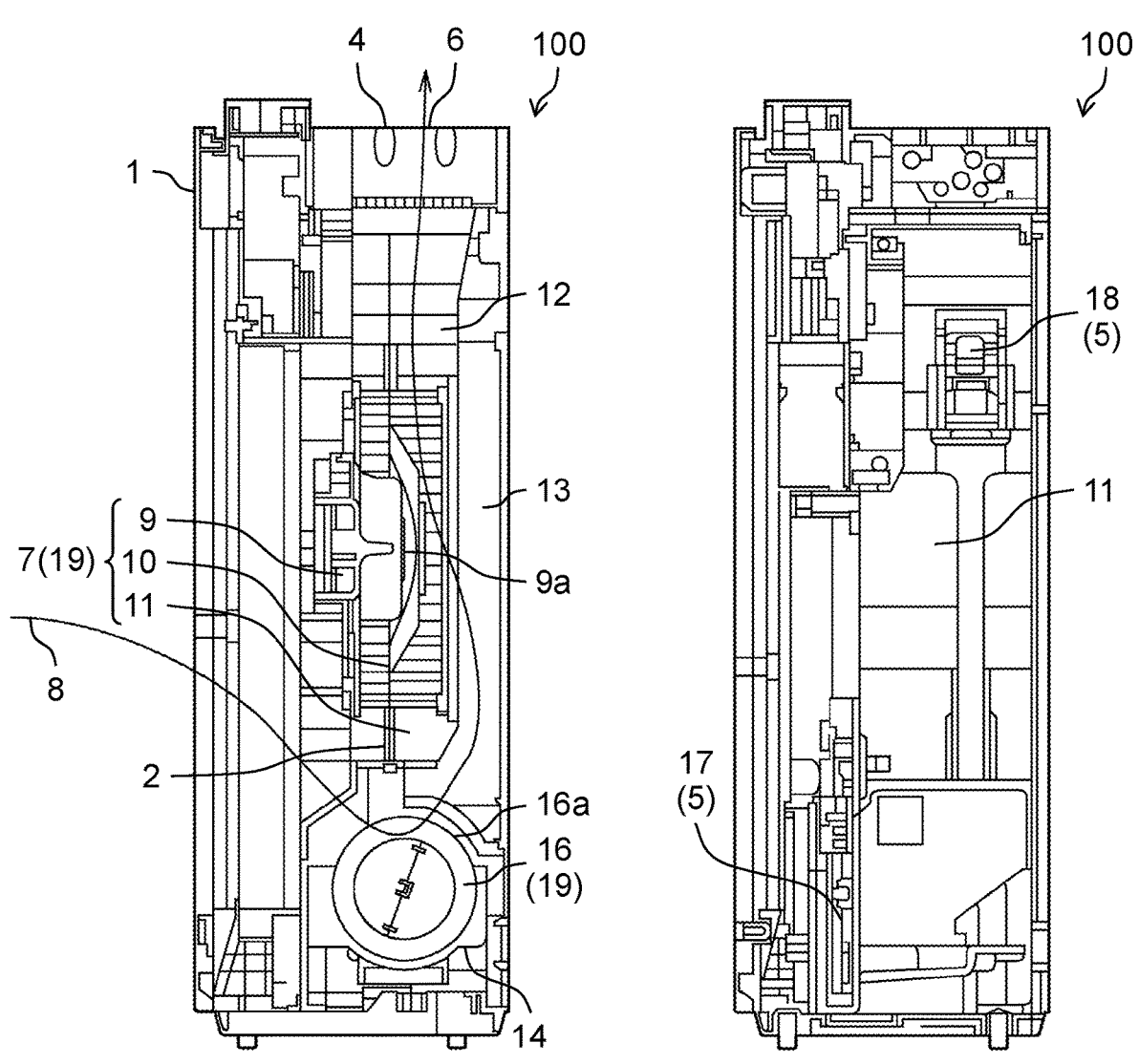
FIG. 3A is a cross-sectional view illustrating the structure of the electrolytic water spraying device illustrated in FIG. 1A and FIG. 1B.
FIG. 3B is a cross-sectional view illustrating the structure of the electrolytic water spraying device illustrated in FIG. 1A and FIG. 1B.

FIG. 3A and FIG. 3B are cross-sectional views each illustrating the structure of electrolytic water spraying device 100. FIG. 3A is a cross-sectional view of electrolytic water spraying device 100 taken vertically at the center as viewed from the front of electrolytic water spraying device 100; electrolytic water spraying device 100 in this cross-sectional view is viewed from the right-hand side thereof. FIG. 3B is a cross-sectional view of electrolytic water spraying device 100 taken vertically on the right-hand side as viewed from the front of electrolytic water spraying device 100; electrolytic water spraying device 100 in this cross-sectional view is viewed from the right-hand side thereof. FIG. 4 is a function block diagram of electrolytic water spraying device 100.

As illustrated in FIG. 1B, FIG. 3A, FIG. 3B, and FIG. 4, electrolyzed water generator 5, water feeder 15, sprayer 19, and air passage 8 are provided in body case 1. Electrolyzed water generator 5 includes reservoir 14, electrolyzer 17, electrolysis-accelerating tablet dispenser 18, controller 30, display 420, and drainage display 430. Reservoir 14 is in the shape of a box with its top open and is configured to hold water. Reservoir 14 is disposed in a lower area of body case 1, can slide horizontally to be attached to and detached from body case 1, and can be removed from body case 1 through opening 4. Reservoir 14 stores water supplied from water feeder 15.

Electrolyzer 17, which includes an electrode member (not illustrated in the drawings), is placed so that the electrode member is submerged in water in reservoir 14. By energizing the electrode member, electrolyzer 17 electrochemically decomposes water containing chloride ions that is stored in reservoir 14, and produces electrolyzed water containing reactive oxygen species. The reactive oxygen species herein are oxygen molecules that exhibit a higher level of oxidative activity than normal oxygen and substances related to the oxygen molecules. For example, the reactive oxygen species include so-called narrow-sense reactive oxygens such as superoxide anions, single oxygen, hydroxyl radical, or hydrogen peroxide, and so-called broad-sense reactive oxygens such as ozone and hypochlorous acid (hypohalous acid). The water containing chloride ions is equivalent to water into which the electrolysis-accelerating tablet has been dispensed.

Electrolyzer 17 produces electrolyzed water by repeating energization and de-energization of the electrode member more than one time. Specifically, electrolyzer 17 defines, as one cycle, energization time during which the electrode member is energized for electrolysis and time following the end of the energization of the electrode member, that is, de-energization time during which the electrode member is not energized, and repeats this cycle more than one time. As a result of setting the de-energization time for the electrode member, the product life of the electrode member is extended. When the energization time is set long with respect to the de-energization time, electrolyzed water containing more reactive oxygen species is produced per cycle. When the de-energization time is set long with respect to the energization time, less reactive oxygen species are generated per cycle. Furthermore, the amount of electric power in the energization time is set large, electrolyzed water containing more reactive oxygen species is produced.

Electrolysis-accelerating tablet dispenser 18 includes: tablet-dispensing case 18a; a tablet-dispensing member (not illustrated in the drawings) provided in tablet-dispensing case 18a; and tablet-dispensing cover 18b detachably provided above tablet-dispensing case 18a. Tablet-dispensing case 18a can be removed from body case 1 through opening 4. A user can detach tablet-dispensing cover 18b from removed tablet-dispensing case 18a and load an electrolysis-accelerating tablet into tablet-dispensing case 18a.

When controller 30 issues an electrolysis-accelerating tablet-dispensing instruction, electrolysis-accelerating tablet dispenser 18 rotates the tablet-dispensing member. The rotation of the tablet-dispensing member causes the electrolysis-accelerating tablet to fall into reservoir 14 through a fall opening (not illustrated in the drawings) of the bottom of tablet-dispensing case 18a. Electrolysis-accelerating tablet dispenser 18 counts the number of electrolysis-accelerating tablets that have fallen from tablet-dispensing case 18a into reservoir 14. When determining that one electrolysis-accelerating tablet has fallen from tablet-dispensing case 18a into reservoir 14, electrolysis-accelerating tablet dispenser 18 stops the rotation of the tablet-dispensing member. The electrolysis-accelerating tablet is dissolved in the water in reservoir 14, and thus water containing chloride ions is produced in reservoir 14. One example of the electrolysis-accelerating tablet is sodium chloride.

Electrolytic water spraying device 100 does not need to include electrolysis-accelerating tablet dispenser 18. In this case, electrolytic water spraying device 100 may display a message that instructs a user to dispense the electrolysis-accelerating tablet or produce sounds that convey said message, for example, so that the user dispenses the electrolysis-accelerating tablet directly into reservoir 14. In the case where electrolysis-accelerating tablet dispenser 18 is not provided, the below-described control related to electrolysis-accelerating tablet dispenser 18 that is performed by controller 30 will be omitted.

Controller 30, which is provided on the opposite side from an operation panel (top panel 20) provided on the top surface of body case 1 (refer to FIG. 1), for example, controls electrolyzed water generator 5. Specifically, controller 30 controls electrolysis of water that is performed by electrolyzer 17. Furthermore, controller 30 controls the displaying of a notification prompting users to supply water into reservoir 14 or drain water from reservoir 14. Moreover, controller 30 controls the dispensing of the electrolysis-accelerating tablet that is performed by electrolysis-accelerating tablet dispenser 18.

Water feeder 15 is placed on an inner side surface of body case 1 that is located on the right-hand side as viewed from the front, can be attached to and detached from reservoir 14, and can be removed from body case 1 through opening 4. Water feeder 15 is attached to tank holder 14a provided on the bottom of reservoir 14.

Water feeder 15 includes: tank 15a that stores water; and lid 15b provided in an opening (not illustrated in the drawings) of tank 15a. An opening/closing portion (not illustrated in the drawings) is provided at the center of lid 15b. When the opening/closing portion is open, the water in tank 15a is supplied to reservoir 14. Specifically, when water feeder 15 is attached to tank holder 14a of reservoir 14 in such a manner that the opening of tank 15a faces down, tank holder 14a opens the opening/closing portion of lid 15b. In other words, when water feeder 15 holding water is attached to tank holder 14a, the opening/closing portion of lid 15b is opened and the water is supplied to reservoir 14 and stored in reservoir 14. When the level of water in reservoir 14 rises and reaches the height of lid 15b, the opening of water feeder 15 is water-sealed and thus, the supplying of water stops. When the level of water in reservoir 14 falls with water left in water feeder 15, the water in tank 15a is supplied to reservoir 14. This means that the level of water in reservoir 14 is maintained constant.

Note that electrolytic water spraying device 100 does not need to include tank 15a as water feeder 15. In this case, a line that supplies tap water to electrolytic water spraying device 100 may be provided so that when the level of water in reservoir 14 falls, the tap water is supplied until the level of water in reservoir 14 rises up to a predetermined position.

Sprayer 19 includes blower 7 and filter unit 16. Blower 7, which is provided in a central area of body case 1, includes: motor unit 9; fan unit 10 that rotates using motor unit 9; and casing unit 11 in the shape of a scroll surrounding motor unit 9 and fan unit 10.

Fan unit 10, which is a sirocco fan, for example, is fixed to rotary shaft 9a extending horizontally from motor unit 9.

Motor unit 9 is fixed to casing unit 11. Rotary shaft 9a of motor unit 9 extends from the front to the back of body case 1. In casing unit 11, discharge outlet 12 is provided on the upper side of casing unit 11 in body case 1, and suction inlet 13 is provided on the back side of casing unit 11 in body case 1.

The fan speed of blower 7 is determined per fan speed unit time (for example, per five-minute period) according to temperature, humidity, the odor level of gas, or the like. The number of revolutions of motor unit 9 is controlled on the basis of the determined fan speed.

Filter unit 16 is a member that brings into contact the electrolyzed water stored in reservoir 14 and room air that has flowed into body case 1 by blower 7. Filter unit 16 includes filter 16a formed into the shape of a circular cylinder and having, in a circumference portion, a hole through which air can circulate. One end of filter unit 16 is disposed so as to be immersed in the electrolyzed water stored in reservoir 14 and thus retains water, and is built in reservoir 14 so as to be rotatable about the center axis of filter 16*a* as the center of rotation. Filter unit 16 is rotated by a driving unit (not illustrated in the drawings) and continuously brings the electrolyzed water and the room air into contact.

Air passage 8 connects air inlet 2 and air outlet 6. Specifically, air passage 8 includes air inlet 2, filter unit 16, blower 7, and air outlet 6 in the order starting with air inlet 2. When fan unit 10 rotates by motor unit 9, outside air that has been suctioned through air inlet 2 and entered air passage 8 is blown out of electrolytic water spraying device 100 via filter 16*a*, blower 7, and air outlet 6. Thus, the electrolyzed water produced in reservoir 14 is sprayed outward. Note that electrolytic water spraying device 100 does not necessarily need to disperse the electrolyzed water itself. The spraying of the electrolyzed water includes spraying of resultant reactive oxygen species derived (volatilized) from the electrolyzed water.

FIG. 5A to FIG. 5C illustrate the outline of operation of electrolytic water spraying device 100. FIG. 5A illustrates the outline of operation of a conventional electrolytic water spraying device as a comparison subject.

In the conventional electrolytic water spraying device, an electrolysis-accelerating tablet is dispensed according to, as a starting point, the timing at which water is drained from the reservoir and water is supplied for the first time. For example, the electrolysis-accelerating tablet is a tablet of a size that allows attachment to the inside of the tablet-dispensing case (hereinafter also referred to as a "salt tablet"), and one salt tablet is dispensed. When the water in the reservoir evaporates due to the operation of the electrolytic water spraying device and reaches a predetermined level, this state is determined as a drought. When the state is determined as a drought, water is supplied to the reservoir. In this example, the state is determined as a drought seven times, which are named as drought 1 to drought 7. In the conventional electrolytic water spraying device, the salt tablet is dispensed at the timing at which three days have elapsed from the starting point. Furthermore, water in the reservoir is drained at the timing at which seven days have elapsed from the starting point. In this manner, the seven-day period is defined as one cycle in which water is drained and supplied and two salt tablets are dispensed.

In order to enable usage in a larger space, electrolytic water spraying device 100 according to the present embodiment needs to improve the performance of spraying the electrolyzed water compared to the above-described conventional electrolytic water spraying device. In this case, the amount of electrolyzed water to be sprayed in a predetermined period increases, and thus the required tank capacity of water feeder 15 also increases, leading to an increase in the amount of water to be supplied in the predetermined period. Therefore, one salt tablet may be insufficient as the amount of salt tablets required in a preset time, and there is a risk that disinfection and deodorizing performance cannot be stably offered.

Furthermore, top panel 20 of electrolytic water spraying device 100 includes electrolysis strength button 122 and fan speed button 124. The strength of electrolysis can be changed using electrolysis strength button 122. The fan speed can be changed using fan speed button 124. FIG. 6A and FIG. 6B illustrate another outline of operation of electrolytic water spraying device 100. FIG. 6A illustrates an electric current value, energization time, and de-energization time when the strength of electrolysis is set to "high" and the fan speed is set to "quiet", "medium", or "high". FIG. 6B illustrates an electric current value, energization time, and de-energization time when the strength of electrolysis is set to "medium" and the fan speed is set to "quiet", "medium", or "high". According to FIG. 6A and FIG. 6B, as the strength of electrolysis increases, the electric current value increases and the energization time increases. As the fan speed increases, the electric current value increases and the energization time increases. Furthermore, when the integrated value of the energization time and the electric current value increases, the amount of consumption of chloride ions increases, and more electrolyzed water is produced. Therefore, the required number of salt tablets varies depending on the settings of the strength of electrolysis and the fan speed. In order to deal with this, electrolytic water spraying device 100 operates as illustrated in FIG. 5B and FIG. 5C.

FIG. 5B illustrates the first operation performed by electrolytic water spraying device 100. FIG. 5B illustrates the outline of operation of electrolytic water spraying device 100 in substantially the same manner as FIG. 5A. Electrolytic water spraying device 100 calculates an electrical characteristic energization amount by integrating electrical characteristic values of energization of the electrode member of electrolyzer 17 that are measured during the three-day period from the starting point. The electrical characteristic value is, for example, the value of a voltage, the value of an electric current, or the value of electric power. When the electrical characteristic energization amount is small, electrolytic water spraying device 100 dispenses one salt tablet at the timing at which three days have elapsed from the starting point. On the other hand, when the electrical characteristic energization amount is large, electrolytic water spraying device 100 dispenses two salt tablets at the timing at which three days have elapsed from the starting point. Furthermore, electrolytic water spraying device 100 follows the same process and drains water from reservoir 14 at the timing at which seven days have elapsed from the starting point. This means that electrolytic water spraying device 100 estimates the amount of consumption of chloride ions from the integrated value of "energization time" and "energization amount (electric current values)" measured after water is drained and replaced until three days later. Subsequently, from the result of the estimation, electrolytic water spraying device 100 determines the amount of salt tablets to be dispensed in the same cycle.

FIG. 5C illustrates the second operation performed by electrolytic water spraying device 100. FIG. 5C illustrates the outline of operation of electrolytic water spraying device 100 in substantially the same manner as FIG. 5A. Electrolytic water spraying device 100 calculates an electrical characteristic energization amount by integrating electrical characteristic values of energization of the electrode member of electrolyzer 17 that are measured during the seven-day period from the starting point. In other words, the second operation is different from the first operation in the length of the integrating period of the electrical characteristic values. Furthermore, electrolytic water spraying device 100 follows the same process and drains water from reservoir 14 at the timing at which seven days have elapsed from the starting point. Moreover, at the starting point of the next cycle, when the electrical characteristic energization amount is small, electrolytic water spraying device 100 dispenses one salt tablet. On the other hand, at the starting point of the next cycle, when the electrical characteristic energization amount is large, electrolytic water spraying device 100 dispenses two salt tablets. This means that electrolytic water spraying device 100 estimates the amount of consumption of chloride ions from the integrated value of "energization time" and "energization amount (electric current values)" measured after water is drained and replaced until one cycle ends. Subsequently, from the result of the estimation, electrolytic water spraying device 100 determines the amount of salt tablets to be dispensed in the next cycle. Note that the first operation and the second operation may be combined.

Hereinafter, the processing of electrolytic water spraying device 100 will be described starting with (1) the first operation and then (2) the second operation with reference to FIG. 4.

(1) First Operation

Energization time counter 200 measures energization time which starts from the aforementioned starting point and for which the electrode member of electrolyzer 17 is energized. The starting point may be a timing at which the operating button on internal panel 25 is pressed or may be a timing at which electrolysis-accelerating tablet dispenser 18 dispenses the electrolysis-accelerating tablet, for example. Energization time counter 200 outputs the measured energization time to controller 30 and integrator 204.

Electrical characteristic value 202 is the value of a voltage or the value of an electric current. Note that electrical characteristic value 202 may be the value of electric power. Electrical characteristic value 202 is measured by a sensor (not illustrated in the drawings), but a value corresponding to the settings of electrolysis strength button 122 and the settings of fan speed button 124 may be set in advance as electrical characteristic value 202.

Integrator 204 calculates an electrical characteristic energization amount by integrating the energization time and the electrical characteristic value. Integrator 204 outputs the electrical characteristic energization amount to controller 30. Energization/dispensing storage 412 included in storage 400 stores the electrical characteristic energization amount and the dispensing amount of electrolysis-accelerating tablets in association. As mentioned earlier, the dispensing amount of electrolysis-accelerating tablets increases with an increase in the electrical characteristic energization amount. The dispensing amount of electrolysis-accelerating tablets decreases with a decrease in the electrical characteristic energization amount.

Dispensing timing controller 320 included in controller 30 controls a dispensing timing that is a timing at which the electrolysis-accelerating tablet is to be dispensed into reservoir 14. Specifically, in first threshold value time comparator 322, when the energization time exceeds a first threshold value, it is determined that the current time is the dispensing timing. For example, the first threshold value is set to a "three-day period".

Dispensing amount controller 310 included in controller 30 controls a dispensing amount that is the amount of electrolysis-accelerating tablets to be dispensed into reservoir 14 at the timing determined by dispensing timing controller 320 as the dispensing timing. Specifically, by referring to energization/dispensing storage 412, dispensing amount controller 310 determines the dispensing amount of electrolysis-accelerating tablets from the electrical characteristic energization amount calculated by integrator 204. At this time, the electrical characteristic energization amount calculated by integrator 204 is equivalent to the electrical characteristic energization amount measured in the "three-day period", for example.

When dispensing timing controller 320 determines the dispensing timing, dispensing timing controller 320 instructs dispensing amount controller 310 to display the dispensing amount of electrolysis-accelerating tablets determined by dispensing amount controller 310. When dispensing amount controller 310 receives the instruction issued by dispensing timing controller 320, dispensing amount controller 310 causes display 420 to display the determined dispensing amount of electrolysis-accelerating tablets. Display 420, which is provided on top panel 20 or the like, for example, displays the dispensing amount of electrolysis-accelerating tablets. When a user checks the dispensing amount of electrolysis-accelerating tablets displayed on display 420, the user dispenses the electrolysis-accelerating tablet according to the dispensing amount.

When dispensing timing controller 320 determines the dispensing timing, dispensing timing controller 320 may instruct dispensing amount controller 310 to dispense the dispensing amount of electrolysis-accelerating tablets determined by dispensing amount controller 310. When dispensing amount controller 310 receives the instruction issued by dispensing timing controller 320, dispensing amount controller 310 instructs electrolysis-accelerating tablet dispenser 18 to dispense the determined dispensing amount of electrolysis-accelerating tablets. Electrolysis-accelerating tablet dispenser 18 dispenses the dispensing amount of electrolysis-accelerating tablets indicated by dispensing amount controller 310 into reservoir 14. The displaying of the dispensing amount of electrolysis-accelerating tablets on display 420 and the dispensing of electrolysis-accelerating tablets by electrolysis-accelerating tablet dispenser 18 may both be performed.

(2) Second Operation

Drainage/dispensing storage 410 included in storage 400 stores a drainage-time dispensing amount that is the amount of electrolysis-accelerating tablets to be dispensed after the drainage process. Drainage/dispensing storage 410 also stores the electrical characteristic energization amount and the dispensing amount of electrolysis-accelerating tablets in association. The dispensing amount of electrolysis-accelerating tablets increases with an increase in the electrical characteristic energization amount. The dispensing amount of electrolysis-accelerating tablets decreases with a decrease in the electrical characteristic energization amount.

Drainage controller 330 included in controller 30 controls the timing of drainage from reservoir 14. Specifically, in second threshold value time comparator 322, when the energization time exceeds a second threshold value, it is determined that the current time is a drainage timing. For example, the second threshold value is set to a "seven-day period". Drainage controller 330 instructs drainage display 430 to display a notification prompting drainage of water. Drainage display 430, which is provided on top panel 20 or the like, for example, displays the notification prompting drainage of water from reservoir 14.

Dispensing amount controller 310 controls the drainage-time dispensing amount that is the amount of electrolysis-accelerating tablets to be dispensed into reservoir 14 at the timing determined by drainage controller 330 as the drainage timing. Specifically, by referring to drainage/dispensing storage 410, dispensing amount controller 310 determines the drainage-time dispensing amount of electrolysis-accelerating tablets from the electrical characteristic energization amount calculated by integrator 204. At this time, the electrical characteristic energization amount calculated by integrator 204 is equivalent to the electrical characteristic energization amount measured in the "seven-day period", for example. Note that it may be possible to dispense a fixed amount of electrolysis-accelerating tablets that is set as the dispensing amount to be applied at the time of drainage and is stored in drainage/dispensing storage 410 in advance, instead of determining the drainage-time dispensing amount of electrolysis-accelerating tablets from the electrical characteristic energization amount calculated by integrator 204.

When drainage controller 330 determines the drainage timing, drainage controller 330 instructs dispensing amount controller 310 to display the drainage-time dispensing amount of electrolysis-accelerating tablets determined by dispensing amount controller 310. When dispensing amount controller 310 receives the instruction issued by drainage controller 330, drainage amount controller 310 causes display 420 to display the determined drainage-time dispensing amount of electrolysis-accelerating tablets. Display 420 displays the drainage-time drainage amount of electrolysis-accelerating tablets. When a user checks the drainage-time dispensing amount of electrolysis-accelerating tablets displayed on display 420, the user dispenses the electrolysis-accelerating tablet according to the drainage-time dispensing amount.

When drainage controller 330 determines the drainage timing, drainage controller 330 may instruct dispensing amount controller 310 to dispense the drainage-time dispensing amount of electrolysis-accelerating tablets determined by dispensing amount controller 310. When dispensing amount controller 310 receives the instruction issued by drainage controller 330, dispensing amount controller 310 instructs electrolysis-accelerating tablet dispenser 18 to dispense the determined drainage-time dispensing amount of electrolysis-accelerating tablets. Electrolysis-accelerating tablet dispenser 18 dispenses the drainage-time dispensing amount of electrolysis-accelerating tablets indicated by dispensing amount controller 310 into reservoir 14. The displaying of the drainage-time dispensing amount of electrolysis-accelerating tablets on display 420 and the dispensing of electrolysis-accelerating tablets by electrolysis-accelerating tablet dispenser 18 may both be performed.

The subject of the device, the system, or the method according to the present disclosure includes a computer. By this computer executing a program, the functions of the subject of the device, the system, or the method according to the present disclosure are implemented. The computer includes, as a primary hardware component, a processor that operates according to the program. The type of the processor is not limited as long as the processor can execute the program to implement the functions. The processor includes one or more electronic circuits including large scale integration (LSI) or a semiconductor integrated circuit. Two or more electronic circuits may be integrated on one chip or may be provided across two or more chips. Two or more chips may be grouped together in one device or may be provided across two or more devices. The program is recorded on a non-transitory recording medium such as a read only memory (ROM), an optical disc, or a hard disk drive that is readable by the computer. The program may have been recorded on the recording medium in advance or may be supplied to the recording medium via a wide area communication network including the Internet or the like.

Figure 7A:
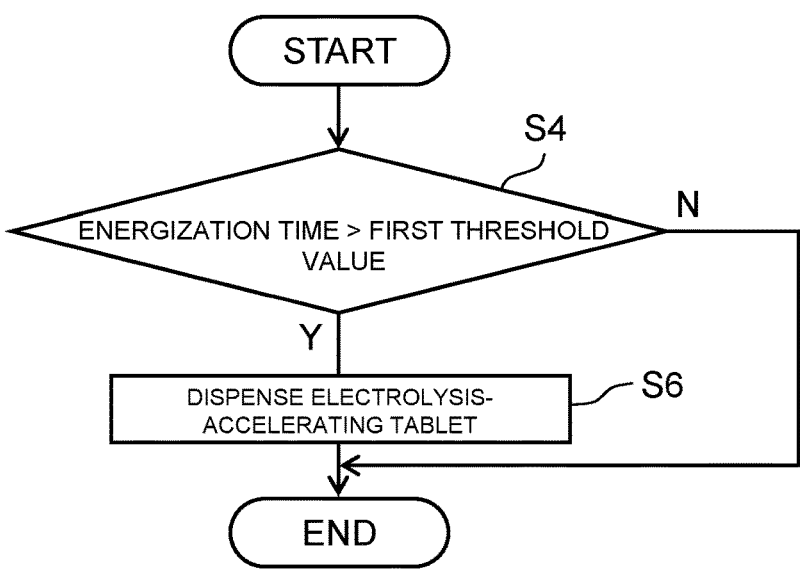
FIG. 7A is a flowchart illustrating a control procedure performed by the electrolytic water spraying device illustrated in FIG. 4.
Figure 7B:
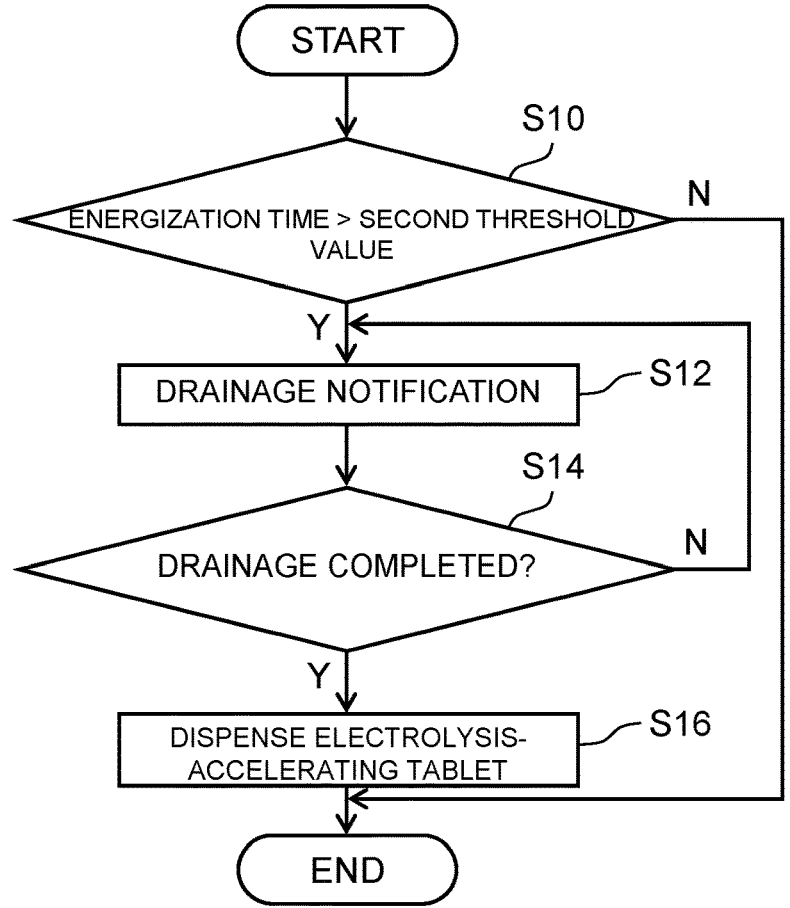
FIG. 7B is a flowchart illustrating a control procedure performed by the electrolytic water spraying device illustrated in FIG. 4.

The operation of electrolytic water spraying device 100 that is performed using the above components will be described. FIG. 7A and FIG. 7B are flowcharts each illustrating the control procedure performed by electrolytic water spraying device 100.

In FIG. 7A, when the energization time is greater than the first threshold value (Yes (Y) in S4), the electrolysis-accelerating tablet is dispensed (S6). When the energization time is not greater than the first threshold value (No (N) in S4), the processing ends.

In FIG. 7B, when the energization time is greater than the second threshold value (Y in S10), drainage display 430 displays a drainage notification (S12). Subsequently, when drainage is not completed (N in S14), the processing returns to Step 12. When drainage is completed (Y in S14), the electrolysis-accelerating tablet is dispensed (S16). When the energization time is not greater than the second threshold value (N in S10), the processing ends.

According to the present example, a dispensing timing that is a timing at which the electrolysis-accelerating tablet is to be dispensed into reservoir 14 is controlled, and a dispensing amount that is the amount of electrolysis-accelerating tablets to be dispensed into reservoir 14 is controlled. With this, electrolysis can be stably performed regardless of usage. Furthermore, an electrical characteristic energization amount is calculated by integrating energization time for the electrode and an electrical characteristic value measured during energization of the electrode. Subsequently, the dispensing amount of electrolysis-accelerating tablets is determined on the basis of the calculated electrical characteristic energization amount. Therefore, the dispensing amount of electrolysis-accelerating tablets that corresponds to usage can be determined.

The electrical characteristic value is the value of a voltage or the value of an electric current. Therefore, the accuracy of the electrical characteristic energization amount can improve.

On the basis of the electrical characteristic energization amount, the dispensing amount associated by energization/dispensing storage 412 is specified; thus, the dispensing amount is determined. Therefore, the processing can be facilitated.

Display 420 is instructed to display the dispensing amount determined by dispensing amount controller 310. Therefore, users can be informed of the dispensing amount.

Electrolysis-accelerating tablet dispenser 18 is instructed to dispense, into reservoir 14, the dispensing amount of electrolysis-accelerating tablets determined by dispensing amount controller 310. Therefore, it is possible to dispense an appropriate dispensing amount of electrolysis-accelerating tablets.

When the energization time exceeds the first threshold value, display 420 is instructed to display the dispensing amount determined by dispensing amount controller 310. Therefore, it is possible to dispense the electrolysis-accelerating tablet at an appropriate timing.

Furthermore, when the energization time exceeds the first threshold value, electrolysis-accelerating tablet dispenser 18 is instructed to dispense, into reservoir 14, the dispensing amount of electrolysis-accelerating tablets determined by dispensing amount controller 310. Therefore, it is possible to dispense the electrolysis-accelerating tablet at an appropriate timing.

When the energization time exceeds the second threshold value, drainage display 430 is instructed to display a notification prompting drainage of water, and after the drainage process, display 420 is instructed to display the drainage-time dispensing amount. Therefore, it is possible to dispense the electrolysis-accelerating tablet at an appropriate timing.

When the energization time exceeds the second threshold value, drainage display 430 is instructed to display a notification prompting drainage of water, and electrolysis-accelerating tablet dispenser 18 is instructed to dispense the electrolysis-accelerating tablet into reservoir 14 after the drainage process. Therefore, it is possible to dispense the electrolysis-accelerating tablet at an appropriate timing.

The outline of one aspect of the present disclosure is as follows.

An electrolytic water spraying device (100) according to an aspect of the present disclosure includes: a reservoir (14) that stores water; a dispensing timing controller (320) that controls a dispensing timing that is a timing at which an electrolysis-accelerating agent is to be dispensed into the reservoir (14); a dispensing amount controller (310) that controls a dispensing amount that is an amount of the electrolysis-accelerating agent to be dispensed into the reservoir (14); and an electrolyzer (17) that produces electrolyzed water by electrolyzing the water stored in the reservoir (14) and into which the electrolysis-accelerating agent has been dispensed.

The electrolytic water spraying device may further include an integrator (204) that calculates an electrical characteristic energization amount by integrating energization time for which an electrode included in the electrolyzer (17) is energized and an electrical characteristic value measured during energization of the electrode. The dispensing amount controller (310) may determine the dispensing amount of the electrolysis-accelerating agent based on the electrical characteristic energization amount calculated by the integrator (204).

The electrical characteristic value may be the value of a voltage or the value of an electric current.

The electrolytic water spraying device may further include an energization/dispensing storage (412) that stores the electrical characteristic energization amount and the dispensing amount of the electrolysis-accelerating agent in association. The dispensing amount controller (310) may determine, based on the electrical characteristic energization amount calculated by the integrator (204), the dispensing amount associated by the energization/dispensing storage (412).

The electrolytic water spraying device may further include a display (420) that displays the dispensing amount. The dispensing amount controller (310) may instruct the display (420) to display the dispensing amount determined by the dispensing amount controller (310).

The electrolytic water spraying device may further include an electrolysis-accelerating agent dispenser (18) that dispenses the electrolysis-accelerating agent into the reservoir (14). The dispensing amount controller (310) may instruct the electrolysis-accelerating agent dispenser (18) to dispense, into the reservoir (14), the dispensing amount of the electrolysis-accelerating agent that has been determined by the dispensing amount controller (310).

The dispensing timing controller (320) may instruct the display (420) to display the dispensing amount determined by the dispensing amount controller (310) when the energization time for the electrode exceeds a first threshold value.

The dispensing timing controller (320) may instruct the electrolysis-accelerating agent dispenser (18) to dispense, into the reservoir (14), the dispensing amount of the electrolysis-accelerating agent that has been determined by the dispensing amount controller (310) when the energization time for the electrode exceeds the first threshold value.

The electrolytic water spraying device may further include: a drainage display (422) that displays a notification prompting drainage of the water from the reservoir (14); a drainage/dispensing storage (410) that stores a drainage-time dispensing amount that is an amount of the electrolysis-accelerating agent to be dispensed into the reservoir (14) after a drainage process; and a drainage controller (330) that controls a drainage timing that is a timing at which the water stored in the reservoir (14) is to be drained. When the energization time for the electrode exceeds a second threshold value, the drainage controller (330) may instruct the drainage display (422) to display the notification prompting the drainage of the water, and after the drainage process, may instruct the display (420) to display the drainage-time dispensing amount stored in the drainage/dispensing storage (410).

The electrolytic water spraying device may further include: a drainage display (422) that displays a notification prompting drainage of the water from the reservoir (14); a drainage/dispensing storage (410) that stores a drainage-time dispensing amount that is an amount of the electrolysis-accelerating agent to be dispensed into the reservoir (14) after a drainage process; and a drainage controller (330) that controls a drainage timing that is a timing at which the water stored in the reservoir (14) is to be drained. When the energization time for the electrode exceeds the second threshold value, the drainage controller (330) may instruct the drainage display (422) to display the notification prompting the drainage of the water, and after the drainage process, may instruct the electrolysis-accelerating agent dispenser (18) to dispense, into the reservoir (14), the drainage-time dispensing amount of the electrolysis-accelerating agent that has been stored in the drainage/dispensing storage (410).

Example 2

Next, Example 2 will be described. As with electrolytic water spraying device 100 according to Example 1, electrolytic water spraying device 100A according to Example 2 adjusts the dispensing amount of electrolysis-accelerating tablets depending on usage. Electrolytic water spraying device 100 according to Example 1 determines the dispensing amount of electrolysis-accelerating tablets on the basis of the electrical characteristic energization amount calculated in a fixed period such as the first threshold value or the second threshold value in each of the first operation and the second operation. In contrast, in electrolytic water spraying device 100A according to Example 2, a period for calculating the electrical characteristic energization amount is not fixed, but changes depending on the situation in which water is supplied to reservoir 14.

Note that structural elements of electrolytic water spraying device 100A according to Example 2 that are substantially the same as the structural elements included in electrolytic water spraying device 100 described in Example 1 will be assigned the same reference marks as those given to said structural elements and description thereof will be omitted or simplified.

Referring to FIG. 5A, in the conventional electrolytic water spraying device, as described earlier, the electrolysis-accelerating tablet is dispensed according to, as a starting point, the timing at which water is drained from the reservoir and water is supplied for the first time. When the water in the reservoir evaporates due to the operation of the electrolytic water spraying device and reaches a predetermined level, this state is determined as a drought. When the state is determined as a drought, water is supplied to the reservoir. In this example, the state is determined as a drought seven times, which are named as drought 1 to drought 7. The salt tablet is dispensed at the timing at which drought 3 is detected. Furthermore, water in the reservoir is drained at the timing at which drought 7 is detected. The processing up to drought 7 is defined as one cycle in which water is drained and supplied and two salt tablets are dispensed. In such a situation, similar to the case of electrolytic water spraying device 100 according to Example 1, the required number of salt tablets varies depending on the settings of the strength of electrolysis and the fan speed. Therefore, electrolytic water spraying device 100A according to Example 2 operates as illustrated in FIG. 5B and FIG. 5C.

FIG. 5B illustrates the first operation performed by electrolytic water spraying device 100A. Electrolytic water spraying device 100A calculates an electrical characteristic energization amount by integrating electrical characteristic values of energization of the electrode member of electrolyzer 17 that are measured between the starting point and drought 3. When the electrical characteristic energization amount is small, electrolytic water spraying device 100A dispenses one salt tablet at the timing at which water is supplied to deal with drought 3. On the other hand, when the electrical characteristic energization amount is large, electrolytic water spraying device 100A dispenses two salt tablets at the timing at which water is supplied to deal with drought 3. Furthermore, electrolytic water spraying device 100A drains water from reservoir 14 at the timing at which drought 7 is detected. This means that electrolytic water spraying device 100 estimates the amount of consumption of chloride ions from the integrated value of "energization time" and "energization amount (electric current values)" measured after water is drained and replaced until drought 3. Subsequently, from the result of the estimation, electrolytic water spraying device 100A determines the amount of salt tablets to be dispensed in the same cycle.

FIG. 5C illustrates the second operation performed by electrolytic water spraying device 100A. Electrolytic water spraying device 100A calculates an electrical characteristic energization amount by integrating electrical characteristic values of energization of the electrode member of electrolyzer 17 that are measured between the starting point and drought 7. In other words, the second operation is different from the first operation in the length of the integrating period of the electrical characteristic values. Furthermore, electrolytic water spraying device 100A drains water from reservoir 14 at the timing at which drought 7 is detected. Moreover, at the starting point of the next cycle, when the electrical characteristic energization amount is small, electrolytic water spraying device 100A dispenses one salt tablet. On the other hand, at the starting point of the next cycle, when the electrical characteristic energization amount is large, electrolytic water spraying device 100A dispenses two salt tablets. This means that electrolytic water spraying device 100A estimates the amount of consumption of chloride ions from the integrated value of "energization time" and "energization amount (electric current values)" measured after water is drained and replaced until one cycle ends. Subsequently, from the result of the estimation, electrolytic water spraying device 100A determines the amount of salt tablets to be dispensed in the next cycle.

Hereinafter, the processing of electrolytic water spraying device 100A will be described starting with (1) the first operation and then (2) the second operation with reference to FIG. 8.

Figure 8:
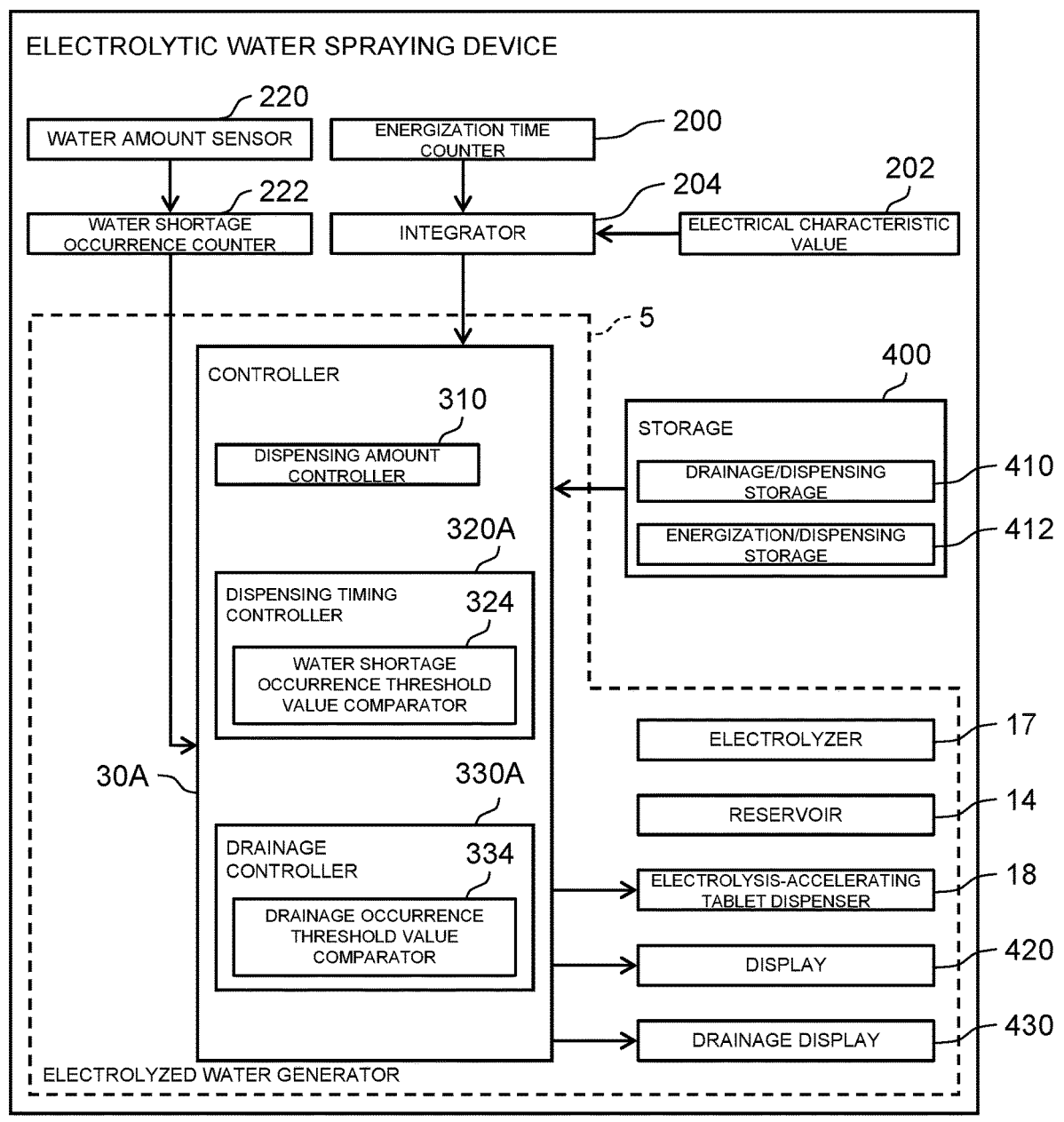
FIG. 8 is a function block diagram of an electrolytic water spraying device according to Example 2.

FIG. 8 is a function block diagram of electrolytic water spraying device 100A. Compared to the function block diagram of electrolytic water spraying device 100 illustrated in FIG. 4, electrolytic water spraying device 100A further includes water amount sensor 220 and water shortage occurrence counter 222. Dispensing timing controller 320A included in controller 30A includes water shortage occurrence threshold value comparator 324. Drainage controller 330A included in controller 30A includes drainage occurrence threshold value comparator 334. Note that dispensing timing controller 320A is different from dispensing timing controller 320 according to Example 1 in that water shortage occurrence threshold value comparator 324 is included instead of first threshold value time comparator 322, but the other configuration and operation of dispensing timing controller 320A are substantially the same as those of dispensing timing controller 320 according to Example 1. Furthermore, drainage controller 330A is different from drainage controller 330 according to Example 1 in that drainage occurrence threshold value comparator 334 is included instead of second threshold value time comparator 322, but the other configuration and operation of drainage controller 330A are substantially the same as those of drainage controller 330 according to Example 1.

(1) First Operation

Water amount sensor 220 is provided on reservoir 14 and senses the amount of water in reservoir 14. The level of water in reservoir 14 is sensed as the amount of water in reservoir 14. Note that description of water amount sensor 220 will be omitted here because it is sufficient that a known technique be used for water amount sensor 220.

Water shortage occurrence counter 222 receives the amount of water sensed by water amount sensor 220. When the amount of water received is lower than (falls below) the level of drought (hereinafter also referred to as a "drought threshold value" or a "third threshold value), water shortage occurrence counter 222 determines that there is a drought in reservoir 14. The drought threshold value is set at a level such that the electrolysis by electrolyzer 17 does not properly proceed. When it is determined that there is a drought, water feeder 15 supplies water to reservoir 14. Note that a situation where there is a drought is equivalent to a water shortage state (a shortage status).

Dispensing timing controller 320A measures the number of occurrences of a water shortage state. When the number of occurrences measured by water shortage occurrence counter 222 exceeds a water shortage occurrence threshold value, dispensing timing controller 320A (water shortage occurrence threshold value comparator 324) determines that the current time is the timing at which the electrolysis-accelerating tablet is to be dispensed. For example, the water shortage occurrence threshold value is set to "three times".

Dispensing amount controller 310 controls the dispensing amount that is the amount of electrolysis-accelerating tablets to be dispensed into reservoir 14 at the timing determined by dispensing timing controller 320A as the dispensing timing. Specifically, by referring to energization/dispensing storage 412, dispensing amount controller 310 determines the dispensing amount of electrolysis-accelerating tablets from the electrical characteristic energization amount calculated by integrator 204. At this time, the electrical characteristic energization amount calculated by integrator 204 is equivalent to the electrical characteristic energization amount measured up to the third drought, for example.

When dispensing timing controller 320A determines the dispensing timing, dispensing timing controller 320A instructs dispensing amount controller 310 to display the dispensing amount of electrolysis-accelerating tablets determined by dispensing amount controller 310. On the other hand, when dispensing timing controller 320A determines the dispensing timing, dispensing timing controller 320A may instruct dispensing amount controller 310 to dispense the dispensing amount of electrolysis-accelerating tablets determined by dispensing amount controller 310. The subsequent processing is substantially the same as that in Example 1 and therefore, description thereof will be omitted.

(2) Second Operation

When the number of occurrences measured by water shortage occurrence counter 222 exceeds a drainage occurrence threshold value, drainage controller 330A (drainage occurrence threshold value comparator 334) determines that the current time is a drainage timing. For example, the drainage occurrence threshold value is set to "seven times". Drainage controller 330A instructs drainage display 430 to display a notification prompting drainage of water.

Drainage display 43 displays the notification prompting drainage of water from reservoir 14.

Dispensing amount controller 310 controls the drainage-time dispensing amount that is the amount of electrolysis-accelerating tablets to be dispensed into reservoir 14 at the timing determined by drainage controller 330A as the drainage timing. Specifically, by referring to drainage/dispensing storage 410, dispensing amount controller 310 determines the drainage-time dispensing amount of electrolysis-accelerating tablets from the electrical characteristic energization amount calculated by integrator 204. At this time, the electrical characteristic energization amount calculated by integrator 204 is equivalent to the electrical characteristic energization amount measured up to the seventh drought, for example. Here, it may be possible to dispense a fixed amount of electrolysis-accelerating tablets that is set as the dispensing amount to be applied at the time of drainage and is stored in drainage/dispensing storage 410 in advance, instead of determining the drainage-time dispensing amount of electrolysis-accelerating tablets from the electrical characteristic energization amount calculated by integrator 204.

When drainage controller 330A determines the drainage timing, drainage controller 330A instructs dispensing amount controller 310 to display the drainage-time dispensing amount of electrolysis-accelerating tablets determined by dispensing amount controller 310. On the other hand, when drainage controller 330A determines the drainage timing, drainage controller 330A may instruct dispensing amount controller 310 to dispense the drainage-time dispensing amount of electrolysis-accelerating tablets determined by dispensing amount controller 310. The subsequent processing is substantially the same as that in Example 1 and therefore, description thereof will be omitted.

Figure 9A:
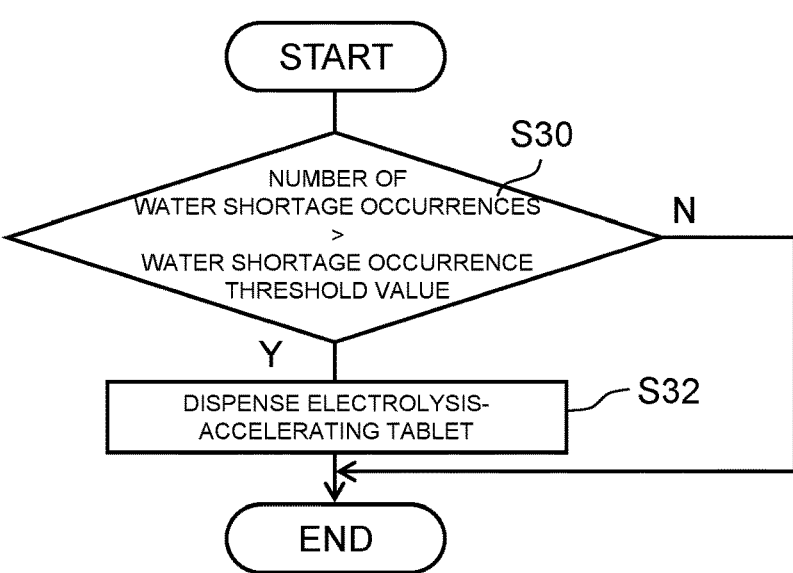
FIG. 9A is a flowchart illustrating a control procedure performed by the electrolytic water spraying device illustrated in FIG. 8.
Figure 9B:
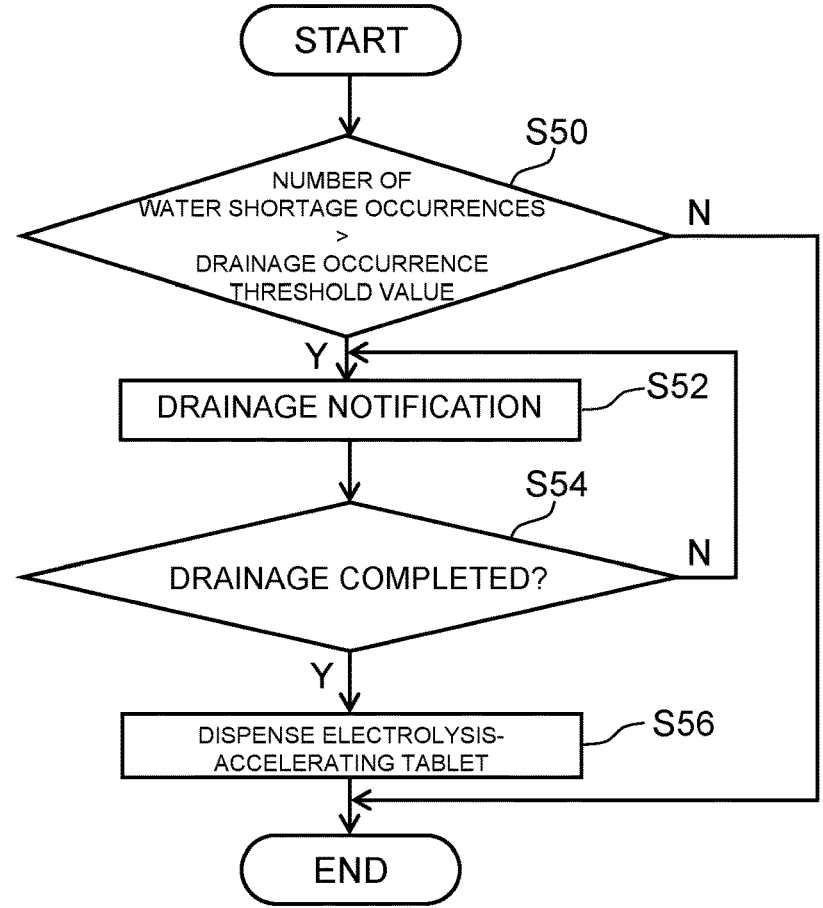
FIG. 9B is a flowchart illustrating a control procedure performed by the electrolytic water spraying device illustrated in FIG. 8.

The operation of electrolytic water spraying device 100A that is performed using the above components will be described. FIG. 9A and FIG. 9B are flowcharts each illustrating the control procedure performed by electrolytic water spraying device 100.

In FIG. 9A, when the number of water shortage occurrences is greater than the water shortage occurrence threshold value (Y in S30), the electrolysis-accelerating tablet is dispensed (S32). When the number of water shortage occurrences is not greater than the water shortage occurrence threshold value (N in S30), the processing ends.

In FIG. 9B, when the number of water shortage occurrences is greater than the drainage occurrence threshold value (Y in S50), drainage display 430 displays a drainage notification (S52). Subsequently, when drainage is not completed (N in S54), the processing returns to Step 52. When drainage is completed (Y in S54), the electrolysis-accelerating tablet is dispensed (S56). When the number of water shortage occurrences is not greater than the drainage occurrence threshold value (N in S50), the processing ends.

According to the present example, when the number of occurrences of the water shortage state exceeds the water shortage occurrence threshold value, dispensing amount controller 310 instructs display 420 to display the determined dispensing amount. Therefore, it is possible to dispense the electrolysis-accelerating tablet at an appropriate timing.

Furthermore, when the number of occurrences of the water shortage state exceeds the water shortage occurrence threshold value, dispensing amount controller 310 instructs electrolysis-accelerating tablet dispenser 18 to dispense the determined dispensing amount of the electrolysis-accelerating agent into reservoir 14. Therefore, it is possible to dispense the electrolysis-accelerating tablet at an appropriate timing.

Furthermore, when the number of occurrences of the water shortage state exceeds the drainage occurrence threshold value, an instruction to display a notification prompting drainage of water is issued, and after the drainage process, display 420 is instructed to display the drainage-time dispensing amount. Therefore, it is possible to dispense the electrolysis-accelerating tablet at an appropriate timing.

Furthermore, when the number of occurrences of the water shortage state exceeds the drainage occurrence threshold value, an instruction to display a notification prompting drainage of water is issued, and after the drainage process, electrolysis-accelerating tablet dispenser 18 is instructed to dispense the electrolysis-accelerating agent into reservoir 14; therefore, it is possible to dispense the electrolysis-accelerating tablet at an appropriate timing.

The outline of one aspect of the present disclosure is as follows.

The electrolytic water spraying device may further include: a water amount sensor (220) that senses an amount of water in the reservoir (14); and a water shortage occurrence counter (222) that measures a total number of occurrences of a water shortage state where the amount of water sensed by the water amount sensor (220) is less than a third threshold value (a drought threshold value). When the total number of occurrences measured by the water shortage occurrence counter (222) exceeds a fourth threshold value (a water shortage occurrence threshold value), the dispensing timing controller (320A) may instruct the display (420) to display the dispensing amount determined.

The electrolytic water spraying device may further include: a water amount sensor (220) that senses an amount of water in the reservoir (14); and a water shortage occurrence counter (222) that measures a total number of occurrences of a water shortage state where the amount of water sensed by the water amount sensor (220) is less than a third threshold value (a drought threshold value). When the total number of occurrences measured by the water shortage occurrence counter (222) exceeds a fourth threshold value (a water shortage occurrence threshold value), the dispensing timing controller (320A) may instruct the electrolysis-accelerating agent dispenser (18) to dispense, into the reservoir (14), the dispensing amount of the electrolysis-accelerating agent that has been determined.

The electrolytic water spraying device may further include: a drainage display (422) that displays a notification prompting drainage of the water from the reservoir (14); a drainage/dispensing storage (410) that stores a drainage-time dispensing amount that is an amount of the electrolysis-accelerating agent to be dispensed into the reservoir (14) after a drainage process; and a drainage controller (330A) that controls a drainage timing that is a timing at which the water stored in the reservoir (14) is to be drained. When the total number of occurrences measured by the water shortage occurrence counter (222) exceeds a fifth threshold value (a drainage occurrence threshold value), the drainage controller (330A) may instruct the drainage display (422) to display the notification prompting the drainage of the water, and after the drainage process, may instruct the display (420) to display the drainage-time dispensing amount stored in the drainage/dispensing storage (410).

The electrolytic water spraying device may further include: a drainage display (422) that displays a notification prompting drainage of the water from the reservoir (14); a drainage/dispensing storage (410) that stores a drainage-time dispensing amount that is an amount of the electrolysis-accelerating agent to be dispensed into the reservoir (14) after a drainage process; and a drainage controller (330A) that controls a drainage timing that is a timing at which the water stored in the reservoir (14) is to be drained. When the number of occurrences measured by the water shortage occurrence counter (222) exceeds a fifth threshold value (a drainage occurrence threshold value), the drainage controller (330A) may instruct the drainage display (422) to display the notification prompting the drainage of the water, and after the drainage process, may instruct the electrolysis-accelerating agent dispenser (18) to dispense, into the reservoir (14), the drainage-time dispensing amount of the electrolysis-accelerating agent that has been stored in the drainage/dispensing storage (410).

Example 3

Next, Example 3 will be described. As with electrolytic water spraying device 100 according to Example 1, electrolytic water spraying device 100B according to Example 3 adjusts the dispensing amount of electrolysis-accelerating tablets depending on usage. Electrolytic water spraying device 100 according to Example 1 determines the dispensing amount of electrolysis-accelerating tablets on the basis of the electrical characteristic energization amount calculated in a fixed period such as the first threshold value or the second threshold value in each of the first operation and the second operation. In contrast, in electrolytic water spraying device 100A according to Example 2, the period for calculating the electrical characteristic energization amount is not fixed, but changes depending on the situation in which water is supplied to reservoir 14. Electrolytic water spraying device 100B according to Example 3 corresponds to the combination of electrolytic water spraying device 100 according to Example 1 and electrolytic water spraying device 100A according to Example 2.

Note that structural elements of electrolytic water spraying device 100B according to Example 3 that are substantially the same as the structural elements included in electrolytic water spraying device 100 described in Example 1 or electrolytic water spraying device 100A described in Example 2 will be assigned the same reference marks as those given to said structural elements and description thereof will be omitted or simplified.

In FIG. 5B, at the earlier one of the timing at which drought 3 is detected and the timing at which three days have elapsed from the starting point, electrolytic water spraying device 100B dispenses the salt tablet. At this time, when the timing at which drought 3 is detected comes earlier, electrolytic water spraying device 100B calculates the electrical characteristic energization amount by integrating the electrical characteristic values measured between the starting point and drought 3. When the timing at which three days have elapsed from the starting point comes earlier, electrolytic water spraying device 100B calculates the electrical characteristic energization amount by integrating the electrical characteristic values measured for three days after the starting point.

In FIG. 5C, at the earlier one of the timing at which drought 7 is detected and the timing at which seven days have elapsed from the starting point, electrolytic water spraying device 100B drains water from reservoir 14. At this time, when the timing at which drought 7 is detected comes earlier, electrolytic water spraying device 100B calculates the electrical characteristic energization amount by integrating the electrical characteristic values measured between the starting point and drought 7. When the timing at which seven days have elapsed from the starting point comes earlier, electrolytic water spraying device 100B calculates the electrical characteristic energization amount by integrating the electrical characteristic values measured for seven days after the starting point.

Hereinafter, the processing of electrolytic water spraying device 100B will be described starting with (1) the first operation and then (2) the second operation with reference to FIG. 10.

Figure 10:
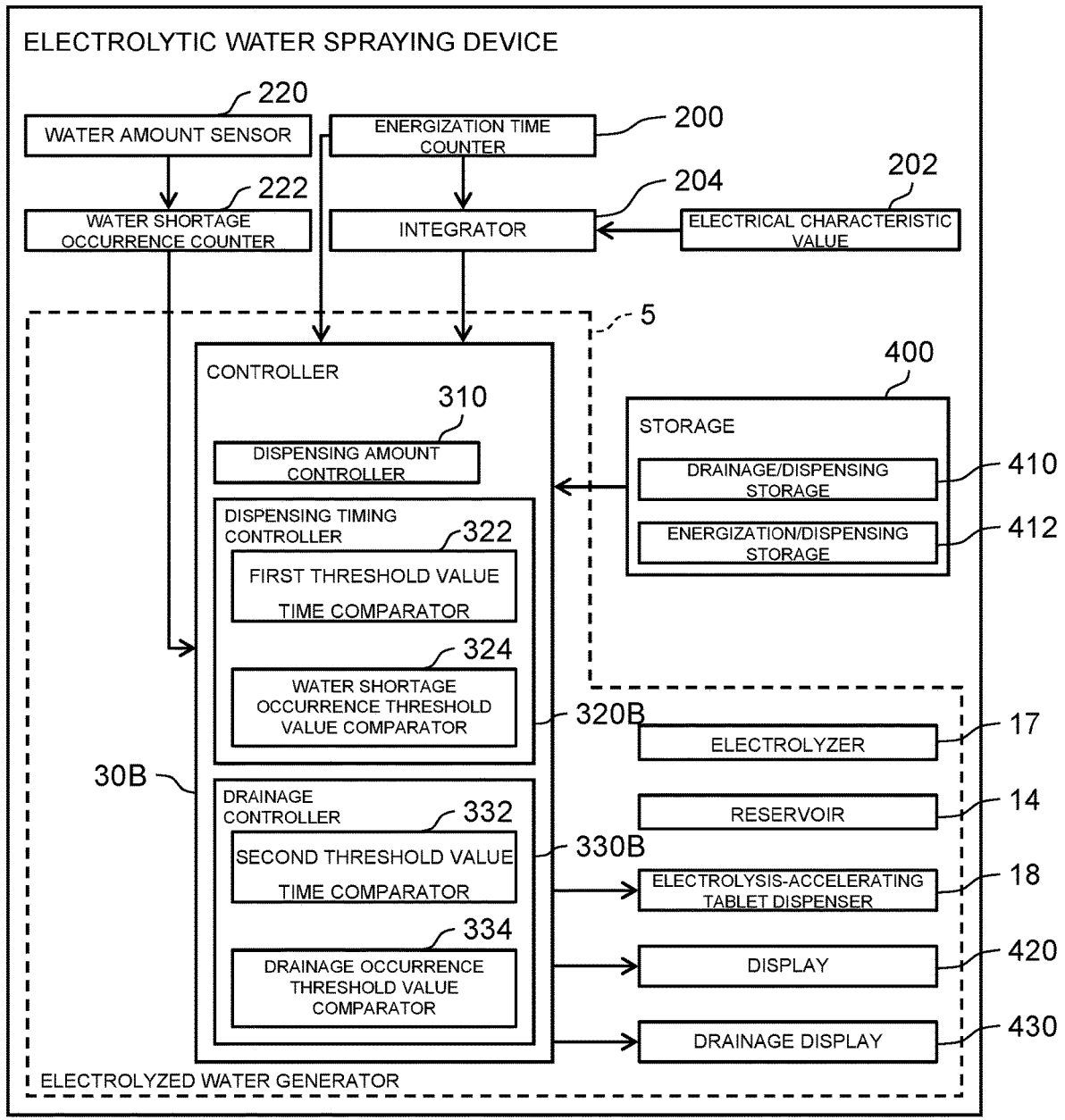
FIG. 10 is a function block diagram of an electrolytic water spraying device according to Example 3.

FIG. 10 is a function block diagram of electrolytic water spraying device 100B. Electrolytic water spraying device 100B corresponds to the combination of FIG. 4 and FIG. 8. Note that dispensing timing controller 320B included in controller 30B is different from dispensing timing controller 320 according to Example 1 and dispensing timing controller 320A according to Example 2 in that both first threshold value time comparator 322 and water shortage occurrence threshold value comparator 324 are included, but the other configuration and operation of dispensing timing controller 320B are substantially the same as those of dispensing timing controller 320 according to Example 1 or dispensing timing controller 320A according to Example 2. Furthermore, drainage controller 330B included in controller 30B is different from drainage controller 330 according to Example 1 or drainage controller 330A according to Example 2 in that both second threshold value time comparator 332 and drainage occurrence threshold value comparator 334 are included, but the other configuration and operation of drainage controller 330B are substantially the same as those of drainage controller 330 according to Example 1 or drainage controller 330A according to Example 2.

(1) First Operation

At the earlier one of the timing at which the energization time exceeds the first threshold value at first threshold value time comparator 322 and the timing at which the number of occurrences exceeds the water shortage occurrence threshold value at water shortage occurrence threshold value comparator 324, dispensing timing controller 320B determines that the current time is a dispensing timing. The subsequent processing is substantially the same as that in Example 1 or Example 2 and therefore, description thereof will be omitted.

(2) Second Operation

At the earlier one of the timing at which the energization time exceeds the second threshold value at second threshold value time comparator 332 and the timing at which the number of occurrences exceeds the drainage occurrence threshold value at drainage occurrence threshold value comparator 334, drainage controller 330B determines that the current time is a drainage timing. The subsequent processing is substantially the same as that in Example 1 or Example 2 and therefore, description thereof will be omitted.

According to the present example, at the relatively earlier one of the timing at which the energization time exceeds the first threshold value and the timing at which the number of occurrences of the water shortage state exceeds the water shortage occurrence threshold value, display 420 is instructed to display the determined dispensing amount. Therefore, it is possible to dispense the electrolysis-accelerating tablet at an appropriate timing.

Furthermore, at the relatively earlier one of the timing at which the energization time exceeds the first threshold value and the timing at which the number of occurrences of the water shortage state exceeds the water shortage occurrence threshold value, electrolysis-accelerating tablet dispenser 18 is instructed to dispense the determined dispensing amount of the electrolysis-accelerating agent into reservoir 14. Therefore, it is possible to dispense the electrolysis-accelerating tablet at an appropriate timing.

Furthermore, at the relatively earlier one of the timing at which the energization time exceeds the second threshold value and the timing at which the number of occurrences of the water shortage state exceeds the drainage occurrence threshold value, an instruction to display a notification prompting drainage of water is issued, and after the drainage process, display 420 is instructed to display the drainage-time dispensing amount. Therefore, it is possible to dispense the electrolysis-accelerating tablet at an appropriate timing.

Furthermore, at the relatively earlier one of the timing at which the energization time exceeds the second threshold value and the timing at which the number of occurrences of the water shortage state exceeds the drainage occurrence threshold value, an instruction to display a notification prompting drainage of water is issued, and after the drainage process, electrolysis-accelerating tablet dispenser 18 is instructed to dispense the electrolysis-accelerating agent into reservoir 14. Therefore, it is possible to dispense the electrolysis-accelerating tablet at an appropriate timing.

The outline of one aspect of the present disclosure is as follows.

The electrolytic water spraying device may further include: a water amount sensor (220) that senses an amount of water in the reservoir (14); and a water shortage occurrence counter (222) that measures a total number of occurrences of a water shortage state where the amount of water sensed by the water amount sensor (220) is less than a sixth threshold value (the drought threshold value). At a relatively earlier one of a timing at which the energization time for the electrode exceeds a seventh threshold value (the first threshold value) and a timing at which the total number of occurrences measured by the water shortage occurrence counter (222) exceeds an eighth threshold value (the water shortage occurrence threshold value), the dispensing timing controller (320) may instruct the display (420) to display the dispensing amount determined.

The electrolytic water spraying device may further include: a water amount sensor (220) that senses an amount of water in the reservoir (14); and a water shortage occurrence counter (222) that measures a total number of occurrences of a water shortage state where the amount of water sensed by the water amount sensor (220) is less than a sixth threshold value (the drought threshold value). At a relatively earlier one of a timing at which the energization time for the electrode exceeds a seventh threshold value (the first threshold value) and a timing at which the number of occurrences measured by the water shortage occurrence counter (222) exceeds an eighth threshold value (the water shortage occurrence threshold value), the dispensing timing controller (320) may instruct the electrolysis-accelerating agent dispenser (18) to dispense, into the reservoir (14), the dispensing amount of the electrolysis-accelerating agent that has been determined.

The electrolytic water spraying device may further include: a drainage display (422) that displays a notification prompting drainage of the water from the reservoir (14); a drainage/dispensing storage (410) that stores a drainage-time dispensing amount that is an amount of the electrolysis-accelerating agent to be dispensed into the reservoir (14) after a drainage process; and a drainage controller (330) that controls a drainage timing that is a timing at which the water stored in the reservoir (14) is to be drained. At a relatively earlier one of a timing at which the energization time for the electrode exceeds a ninth threshold value (the second threshold value) and a timing at which the total number of occurrences measured by the water shortage occurrence counter (222) exceeds a tenth threshold value (the drainage occurrence threshold value), the drainage controller (330) may instruct the drainage display (422) to display the notification prompting the drainage of the water, and after the drainage process, may instruct the display (420) to display the drainage-time dispensing amount stored in the drainage dispensing storage (410).

The electrolytic water spraying device may further include: a drainage display (422) that displays a notification prompting drainage of the water from the reservoir (14); a drainage/dispensing storage (410) that stores a drainage-time dispensing amount that is an amount of the electrolysis-accelerating agent to be dispensed into the reservoir (14) after a drainage process; and a drainage controller (330) that controls a drainage timing that is a timing at which the water stored in the reservoir (14) is to be drained. At a relatively earlier one of a timing at which the energization time for the electrode exceeds a ninth threshold value (the second threshold value) and a timing at which the total number of occurrences measured by the water shortage occurrence counter (222) exceeds a tenth threshold value (the drainage occurrence threshold value), the drainage controller (330) may instruct the drainage display (422) to display the notification prompting the drainage of the water, and after the drainage process, may instruct the electrolysis-accelerating agent dispenser (18) to dispense, into the reservoir (14), the drainage-time dispensing amount of the electrolysis-accelerating agent that has been stored in the drainage/dispensing storage (410).

The present disclosure has thus far been described on the basis of Examples 1 to 3. These example are merely illustrative; a person having ordinary skill in the art would understand that various variations are available for the combination of the structural elements or the processes according to these examples and that those variations are also within the scope of the present disclosure.

In Examples 1 to 3, the electrolysis-accelerating tablet is dispensed. However, this is not limiting; for example, an electrolysis-accelerating agent that is not a tablet may be dispensed. This variation can improve design flexibility.

In Examples 1 to 3, the first threshold value is set to the three-day period, the second threshold value is set to the seven-day period, the water shortage occurrence threshold value is set to three times, and the drainage occurrence threshold value is set to seven times. However, this is not limiting; for example, these threshold values may be different values as long as the first threshold value is less than the second threshold value and the water shortage occurrence threshold value is less than the drainage occurrence threshold value. This variation can improve design flexibility.

Furthermore, in Examples 1 to 3, electrolysis-accelerating tablet dispenser 18 may further include a dispensing sensor (not illustrated in the drawings) that senses that electrolysis-accelerating agent dispenser 18 has dispensed the electrolysis-accelerating agent. The dispensing sensor may include a counter (not illustrated in the drawings) that counts the number of times of sensing of the dispensing sensor as the dispensing amount of the electrolysis-accelerating agent. The counter may transmit the dispensing amount of the electrolysis-accelerating agent, which is the number of times of sensing of the dispensing sensor, to dispensing amount controller 310.

One example of the dispensing sensor will be described now. The dispensing sensor includes a light-emitting element and a light-receiving element. The light-emitting element is a light-emitting diode which outputs light. The light-receiving element is a photodiode which is provided facing the light-emitting element, receives the light output from the light-emitting element, and converts the received light into electrical signals according to light intensity. The light-emitting element and the light-receiving element are provided midway through the passage between the fall opening of the bottom of tablet-dispensing case 18a and reservoir 14 and are paired and arranged so as to sandwich a passing route through which the electrolysis-accelerating tablet passes.

When the electrolysis-accelerating tablet passes between the light-emitting element and the light-receiving element and interrupts the passage of the light output from the light-emitting element, the intensity of the light received by the light-receiving element is reduced. On the basis of a change in the intensity of the light received by the light-receiving element, the dispensing sensor can sense that electrolysis-accelerating tablet dispenser 18 has dispensed the electrolysis-accelerating tablet.

Dispensing amount controller 310 compares the dispensing amount of the electrolysis-accelerating agent counted by the counter and the dispensing amount determined by dispensing amount controller 310. When the dispensing amount of the electrolysis-accelerating agent counted by the counter is less than the dispensing amount determined by dispensing amount controller 310, dispensing amount controller 310 issues an instruction to electrolysis-accelerating agent dispenser 18 so that the dispensing amount counted by the counter satisfies the dispensing amount determined by dispensing amount controller 310. Specifically, dispensing amount controller 310 instructs electrolysis-accelerating agent dispenser 18 to dispense the electrolysis-accelerating agent in an amount corresponding to the difference between the dispensing amount determined by dispensing amount controller 310 and the dispensing amount of the electrolysis-accelerating agent counted by the counter.

Thus, it is possible to dispense, into reservoir 14, the dispensing amount of the electrolysis-accelerating agent that has been determined by dispensing amount controller 310.

REFERENCE MARKS IN THE DRAWINGS 1 body case
1A body side surface
2 air inlet
3 panel
4 opening
5 electrolyzed water generator
6 air outlet 7 blower
8 air passage
9 motor unit
9a rotary shaft
10 fan unit
11 casing unit
12 discharge outlet
13 suction inlet
14 reservoir
14a tank holder
15 water feeder
15a tank
15b lid
16 filter unit
16a filter
17 electrolyzer
18 electrolysis-accelerating tablet dispenser (electrolysis-accelerating agent dispenser)
18a tablet-dispensing case
18b tablet-dispensing cover
19 sprayer
20 top panel
25 internal panel
30, 30A, 30B controller
100, 100A, 100B electrolytic water spraying device
120 power button
122 electrolysis strength button
124 fan speed button
200 energization time counter
202 electrical characteristic value
204 integrator
220 water amount sensor
222 water shortage occurrence counter
310 dispensing amount controller
320, 320A, 320B dispensing timing controller
322 first threshold value time comparator
324 water shortage occurrence threshold value comparator
330, 330A, 330B drainage controller
332 second threshold value time comparator
334 drainage occurrence threshold value comparator
400 storage
410 drainage/dispensing storage
412 energization/dispensing storage
420 display
430 drainage display

What is claimed is:

1. An electrolytic water spraying device comprising:
a reservoir that stores water;
a dispensing timing controller that controls a dispensing timing that is a timing at which an electrolysis-accelerating agent is to be dispensed into the reservoir;
a dispensing amount controller that controls a dispensing amount that is an amount of the electrolysis-accelerating agent to be dispensed into the reservoir;
an electrolyzer that produces electrolyzed water by electrolyzing the water stored in the reservoir, the water being water in which the electrolysis-accelerating agent has been dispensed; and
an integrator that calculates an electrical characteristic energization amount by integrating energization time for which an electrode included in the electrolyzer is energized and an electrical characteristic value measured during energization of the electrode after the electrolysis-accelerating agent is dispensed according to, as a starting point, a timing at which water is drained from the reservoir and water is supplied, wherein the dispensing amount controller determines the dispensing amount when the electrolysis-accelerating agent is dispensed based on the electrical characteristic energization amount calculated by the integrator.

2. The electrolytic water spraying device according to claim 1, wherein the electrical characteristic value is a value of a voltage or a value of an electric current.

3. The electrolytic water spraying device according to claim 1, further comprising:

an energization/dispensing storage that stores the electrical characteristic energization amount and the dispensing amount in association, wherein the dispensing amount controller determines the dispensing amount by specifying, based on the electrical characteristic energization amount calculated by the integrator, the dispensing amount associated by the energization/dispensing storage.

4. The electrolytic water spraying device according to claim 1, further comprising:

a display that displays the dispensing amount, wherein the dispensing amount controller instructs the display to display the dispensing amount determined by the dispensing amount controller.

5. The electrolytic water spraying device according to claim 4, wherein when the energization time for the electrode exceeds a first threshold value, the dispensing timing controller instructs the display to display the dispensing amount determined by the dispensing amount controller.

6. The electrolytic water spraying device according to claim 5, further comprising:

a drainage display that displays a notification prompting drainage of the water from the reservoir;

a drainage/dispensing storage that stores a drainage-time dispensing amount that is an amount of the electrolysis-accelerating agent to be dispensed into the reservoir after a drainage process; and a drainage controller that controls a drainage timing that is a timing at which the water stored in the reservoir is to be drained, wherein when the energization time for the electrode exceeds a second threshold value, the drainage controller instructs the drainage display to display the notification prompting the drainage of the water, and after the drainage process, the drainage controller instructs the display to display the drainage-time dispensing amount stored in the drainage/dispensing storage.

7. The electrolytic water spraying device according to claim 4, further comprising:

a water amount sensor that senses an amount of water in the reservoir; and a water shortage occurrence counter that measures a total number of occurrences of a water shortage state where the amount of water sensed by the water amount sensor is less than a third threshold value, wherein when the total number of occurrences measured by the water shortage occurrence counter exceeds a fourth threshold value, the dispensing timing controller instructs the display to display the dispensing amount determined.

8. The electrolytic water spraying device according to claim 7, further comprising:

a drainage display that displays a notification prompting drainage of the water from the reservoir;

a drainage/dispensing storage that stores a drainage-time dispensing amount that is an amount of the electrolysis-accelerating agent to be dispensed into the reservoir after a drainage process; and a drainage controller that controls a drainage timing that is a timing at which the water stored in the reservoir is to be drained, wherein when the total number of occurrences measured by the water shortage occurrence counter exceeds a fifth threshold value, the drainage controller instructs the drainage display to display the notification prompting the drainage of the water, and after the drainage process, the drainage controller instructs the display to display the drainage-time dispensing amount stored in the drainage/dispensing storage.

9. The electrolytic water spraying device according to claim 4, further comprising:

a water amount sensor that senses an amount of water in the reservoir; and a water shortage occurrence counter that measures a total number of occurrences of a water shortage state where the amount of water sensed by the water amount sensor is less than a sixth threshold value, wherein at a relatively earlier one of a timing at which the energization time for the electrode exceeds a seventh threshold value and a timing at which the total number of occurrences measured by the water shortage occurrence counter exceeds an eighth threshold value, the dispensing timing controller instructs the display to display the dispensing amount determined.

10. The electrolytic water spraying device according to claim 9, further comprising:

a drainage display that displays a notification prompting drainage of the water from the reservoir;

a drainage/dispensing storage that stores a drainage-time dispensing amount that is an amount of the electrolysis-accelerating agent to be dispensed into the reservoir after a drainage process; and a drainage controller that controls a drainage timing that is a timing at which the water stored in the reservoir is to be drained, wherein at a relatively earlier one of a timing at which the energization time for the electrode exceeds a ninth threshold value and a timing at which the total number of occurrences measured by the water shortage occurrence counter exceeds a tenth threshold value, the drainage controller instructs the drainage display to display the notification prompting the drainage of the water, and after the drainage process, the drainage controller instructs the display to display the drainage-time dispensing amount stored in the drainage/dispensing storage.

11. The electrolytic water spraying device according to claim 1, further comprising:

an electrolysis-accelerating agent dispenser that dispenses the electrolysis-accelerating agent into the reservoir, wherein the dispensing amount controller instructs the electrolysis-accelerating agent dispenser to dispense, into the reservoir, the dispensing amount of the electrolysis-accelerating agent that has been determined by the dispensing amount controller.

12. The electrolytic water spraying device according to claim 11, wherein when the energization time for the electrode exceeds a first threshold value, the dispensing timing controller instructs the electrolysis-accelerating agent dispenser to dispense, into the reservoir, the dispensing amount of the electrolysis-accelerating agent that has been determined by the dispensing amount controller.

13. The electrolytic water spraying device according to claim 11, further comprising:
a water amount sensor that senses an amount of water in the reservoir; and
a water shortage occurrence counter that measures a total number of occurrences of a water shortage state where the amount of water sensed by the water amount sensor is less than a third threshold value, wherein
when the total number of occurrences measured by the water shortage occurrence counter exceeds a fourth threshold value, the dispensing timing controller instructs the electrolysis-accelerating agent dispenser to dispense, into the reservoir, the dispensing amount of the electrolysis-accelerating agent that has been determined.

14. The electrolytic water spraying device according to claim 13, further comprising:
a drainage display that displays a notification prompting drainage of the water from the reservoir;
a drainage/dispensing storage that stores a drainage-time dispensing amount that is an amount of the electrolysis-accelerating agent to be dispensed into the reservoir after a drainage process; and
a drainage controller that controls a drainage timing that is a timing at which the water stored in the reservoir is to be drained, wherein
when the total number of occurrences measured by the water shortage occurrence counter exceeds a fifth threshold value, the drainage controller instructs the drainage display to display the notification prompting the drainage of the water, and
after the drainage process, the drainage controller instructs the electrolysis-accelerating agent dispenser to dispense, into the reservoir, the drainage-time dispensing amount of the electrolysis-accelerating agent that has been stored in the drainage/dispensing storage.

15. The electrolytic water spraying device according to claim 11, further comprising:
a water amount sensor that senses an amount of water in the reservoir; and
a water shortage occurrence counter that measures a total number of occurrences of a water shortage state where the amount of water sensed by the water amount sensor is less than a sixth threshold value, wherein
at a relatively earlier one of a timing at which the energization time for the electrode exceeds a seventh threshold value and a timing at which the total number of occurrences measured by the water shortage occurrence counter exceeds an eighth threshold value, the dispensing timing controller instructs the electrolysis-accelerating agent dispenser to dispense, into the reservoir, the dispensing amount of the electrolysis-accelerating agent that has been determined.

16. The electrolytic water spraying device according to claim 15, further comprising:
a drainage display that displays a notification prompting drainage of the water from the reservoir;
a drainage/dispensing storage that stores a drainage-time dispensing amount that is an amount of the electrolysis-accelerating agent to be dispensed into the reservoir after a drainage process; and a drainage controller that controls a drainage timing that is a timing at which the water stored in the reservoir is to be drained, wherein
at a relatively earlier one of a timing at which the energization time for the electrode exceeds a ninth threshold value and a timing at which the total number of occurrences measured by the water shortage occurrence counter exceeds a tenth threshold value, the drainage controller instructs the drainage display to display the notification prompting the drainage of the water, and
after the drainage process, the drainage controller instructs the electrolysis-accelerating agent dispenser to dispense, into the reservoir, the drainage-time dispensing amount of the electrolysis-accelerating agent that has been stored in the drainage/dispensing storage.

17. The electrolytic water spraying device according to claim 1, wherein the electrolysis-accelerating agent dispensed into the reservoir is a plurality of electrolysis-accelerating tablets.

18. An electrolytic water spraying device comprising:
a reservoir that stores water;
a dispensing timing controller that controls a dispensing timing that is a timing at which an electrolysis-accelerating agent is to be dispensed into the reservoir;
a dispensing amount controller that controls a dispensing amount that is an amount of the electrolysis-accelerating agent to be dispensed into the reservoir;
an electrolyzer that produces electrolyzed water by electrolyzing the water stored in the reservoir, the water being water in which the electrolysis-accelerating agent has been dispensed;
an integrator that calculates an electrical characteristic energization amount by integrating energization time for which an electrode included in the electrolyzer is energized and an electrical characteristic value measured during energization of the electrode,
wherein the dispensing amount controller determines the dispensing amount based on the electrical characteristic energization amount calculated by the integrator,
the electrolytic water spraying device further comprises an electrolysis-accelerating agent dispenser that dispenses the electrolysis-accelerating agent into the reservoir,
the dispensing amount controller instructs the electrolysis-accelerating agent dispenser to dispense, into the reservoir, the dispensing amount of the electrolysis-accelerating agent that has been determined by the dispensing amount controller,
when the energization time for the electrode exceeds a first threshold value, the dispensing timing controller instructs the electrolysis-accelerating agent dispenser to dispense, into the reservoir, the dispensing amount of the electrolysis-accelerating agent that has been determined by the dispensing amount controller,
wherein the electrolytic water spraying device further comprises: a drainage display that displays a notification prompting drainage of the water from the reservoir;
a drainage/dispensing storage that stores a drainage-time dispensing amount that is an amount of the electrolysis-accelerating agent to be dispensed into the reservoir after a drainage process; and
a drainage controller that controls a drainage timing that is a timing at which the water stored in the reservoir is to be drained, when the energization time for the electrode exceeds a second threshold value, the drainage controller instructs the drainage display to display the notification prompting the drainage of the water, and after the drainage process, the drainage controller instructs the electrolysis-accelerating agent dispenser to dispense, into the reservoir, the drainage-time dispensing amount of the electrolysis-accelerating agent that has been stored in the drainage/dispensing storage.

19. The electrolytic water spraying device according to claim 18, wherein the electrolysis-accelerating agent dispensed into the reservoir is a plurality of electrolysis-accelerating tablets.

20. An electrolytic water spraying device comprising:

a reservoir that stores water;

a dispensing timing controller that controls a dispensing timing that is a timing at which an electrolysis-accelerating agent is to be dispensed into the reservoir;

a dispensing amount controller that controls a dispensing amount that is an amount of the electrolysis-accelerating agent to be dispensed into the reservoir;

an electrolyzer that produces electrolyzed water by electrolyzing the water stored in the reservoir, the water being water in which the electrolysis-accelerating agent has been dispensed; and an integrator that calculates an electrical characteristic energization amount by integrating energization time for which an electrode included in the electrolyzer is energized and an electrical characteristic value measured during energization of the electrode, wherein the dispensing amount controller determines the dispensing amount based on the electrical characteristic energization amount calculated by the integrator, the electrolytic water spraying device further comprises an electrolysis-accelerating agent dispenser that dispenses the electrolysis-accelerating agent into the reservoir, the dispensing amount controller instructs the electrolysis-accelerating agent dispenser to dispense, into the reservoir, the dispensing amount of the electrolysis-accelerating agent that has been determined by the dispensing amount controller, the electrolytic water spraying device further comprises:

a dispensing sensor that senses that the electrolysis-accelerating agent dispenser has dispensed the electrolysis-accelerating agent; and a counter that counts a total number of times of sensing of the dispensing sensor as the dispensing amount of the electrolysis-accelerating agent, wherein the dispensing amount controller instructs the electrolysis-accelerating agent dispenser to dispense the electrolysis-accelerating agent in an amount corresponding to a difference between the dispensing amount determined by the dispensing amount controller and the dispensing amount counted by the counter to cause the dispensing amount counted by the counter to satisfy the dispensing amount determined by the dispensing amount controller when the dispensing amount counted by the counter is less than the dispensing amount determined by the dispensing amount controller.

21. The electrolytic water spraying device according to claim 20, wherein the electrolysis-accelerating agent dispensed into the reservoir is a plurality of electrolysis-accelerating tablets.

* * * * *